A. MALMQUIST.
CAN SEALING APPARATUS.
APPLICATION FILED APR. 2, 1913.
1,099,756.
Patented June 9, 1914.
14 SHEETS—SHEET 3.
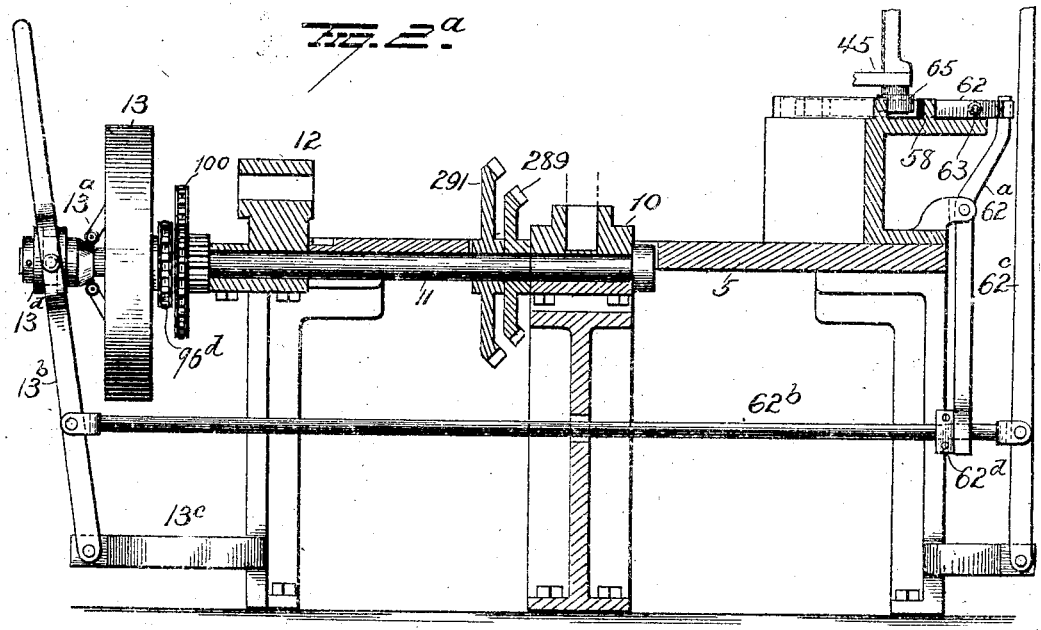
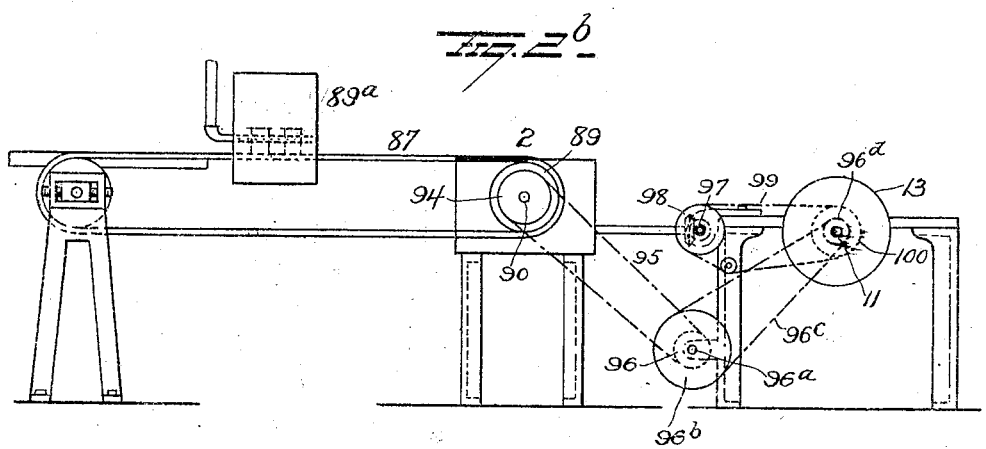
WITNESSES
INVENTOR
A. Malmquist
Attorney

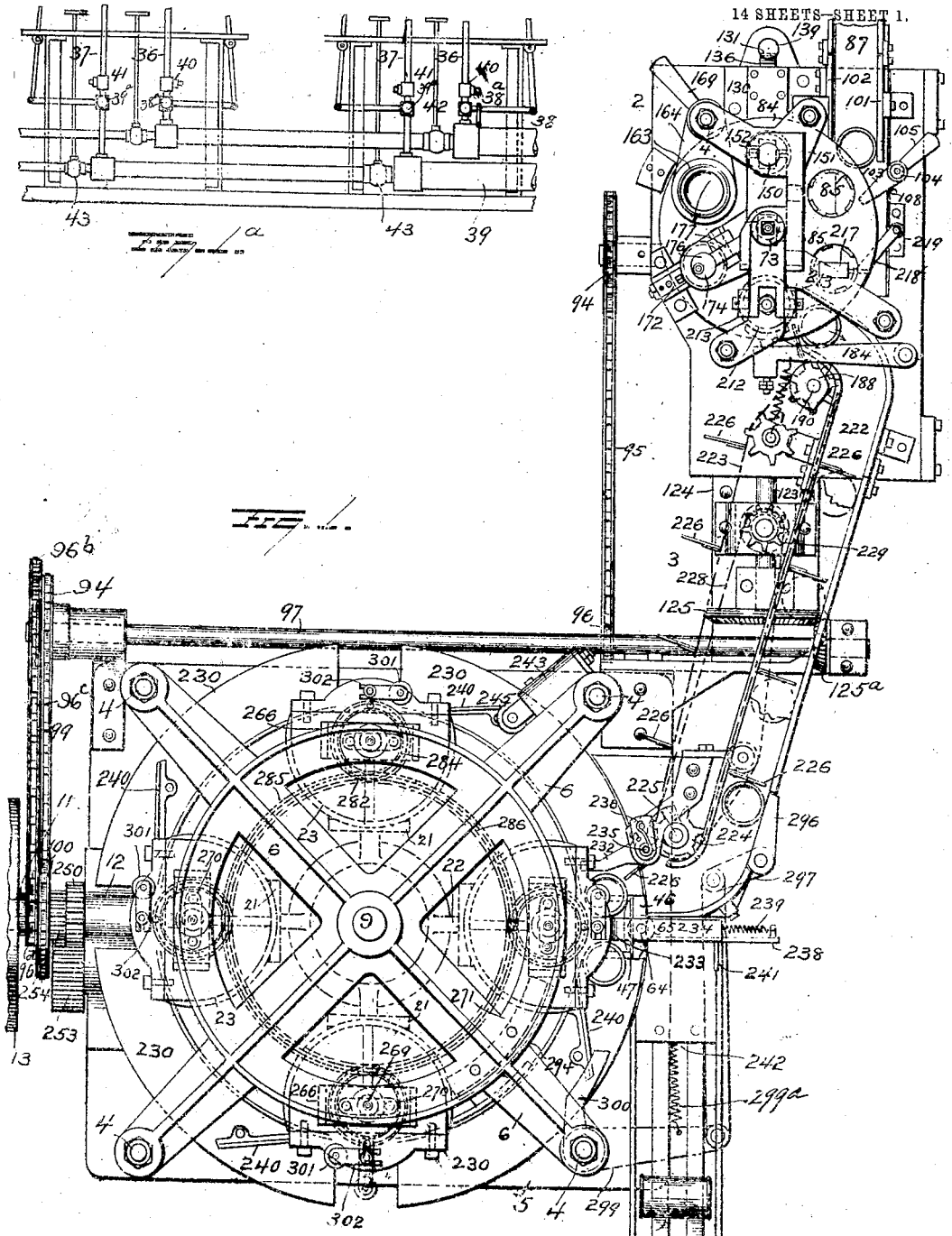

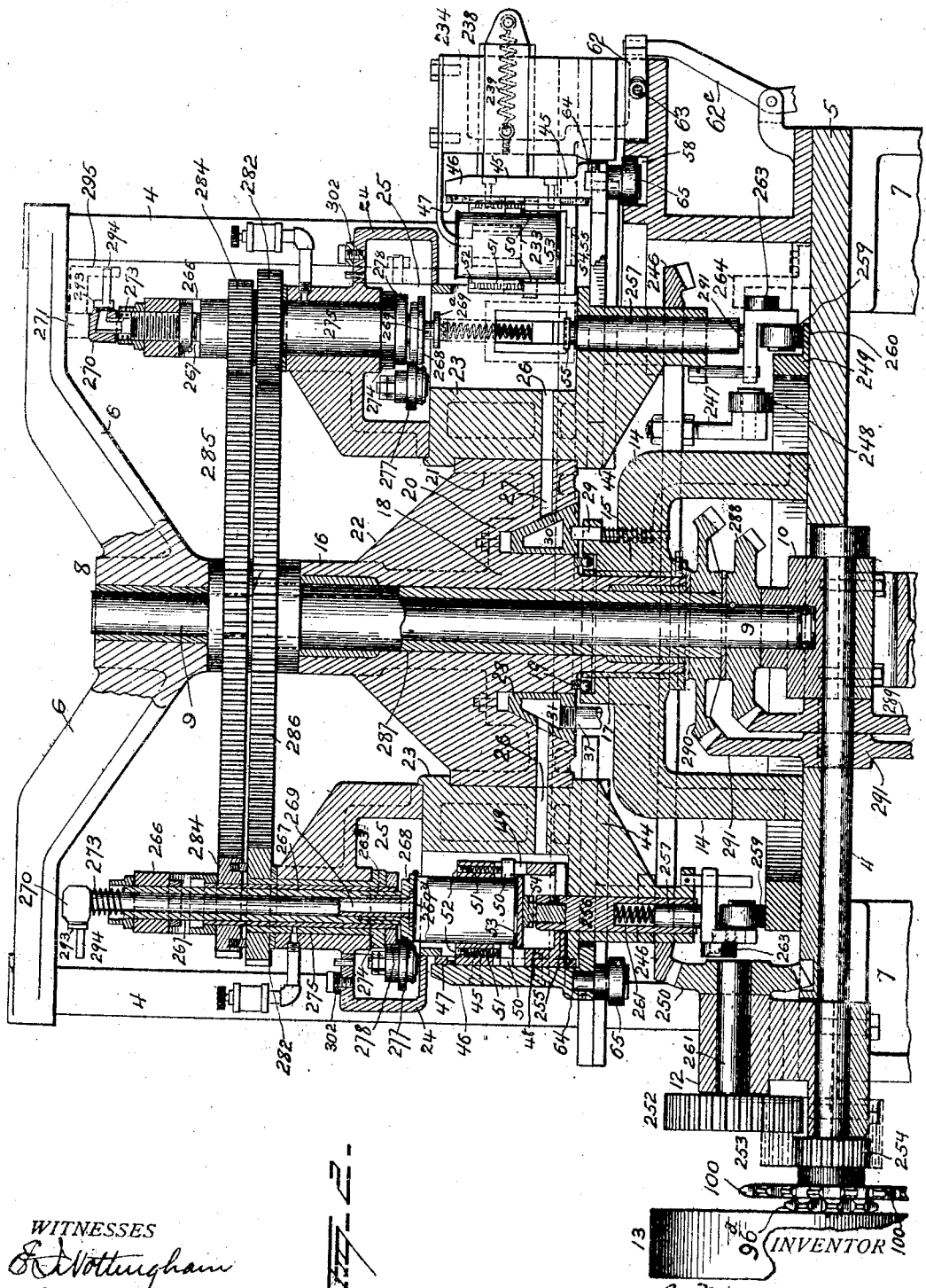

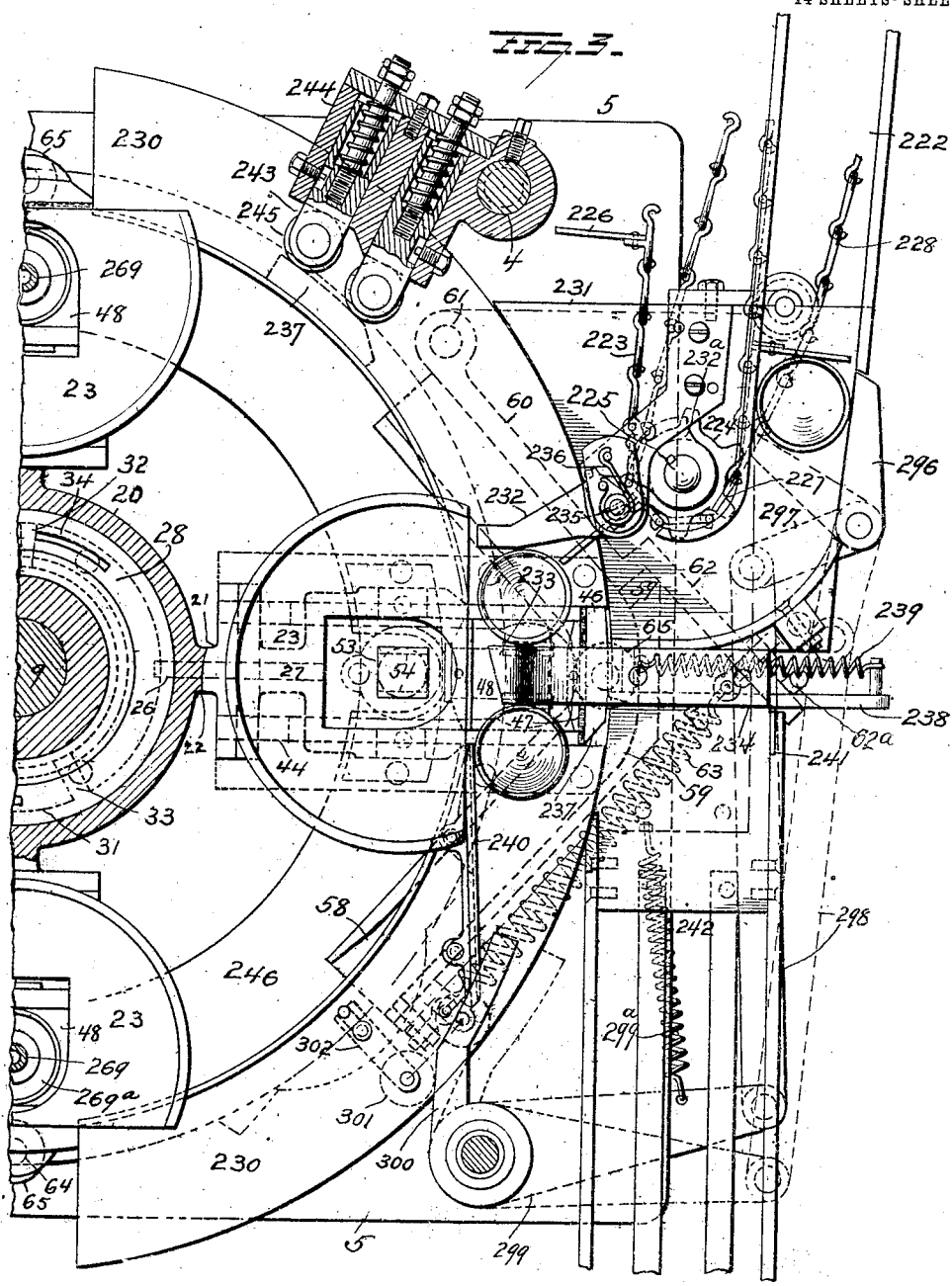

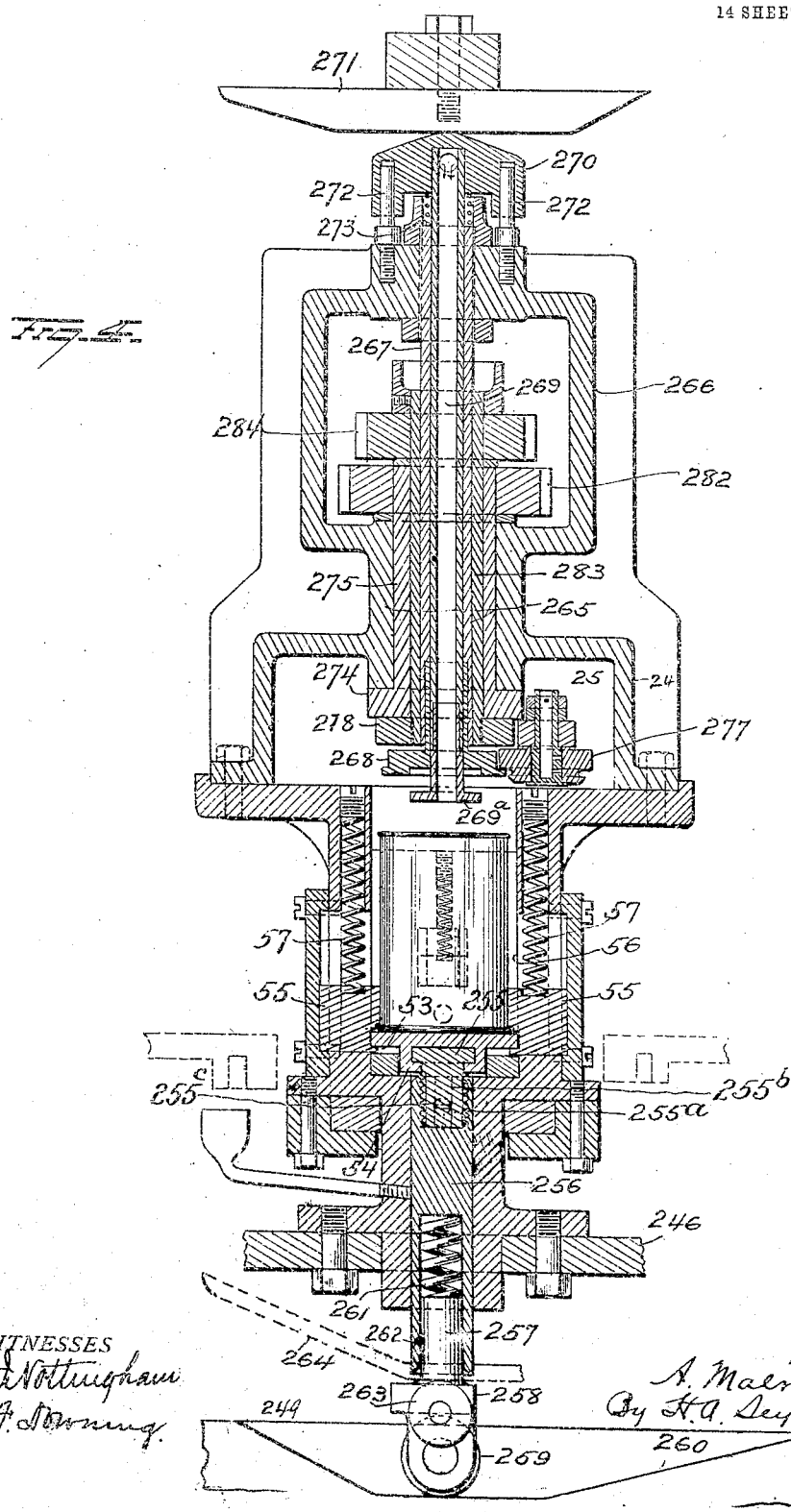

A. MALMQUIST.
CAN SEALING APPARATUS.
APPLICATION FILED APR. 2, 1913.
1,099,756.
Patented June 9, 1914.
14 SHEETS—SHEET 6.
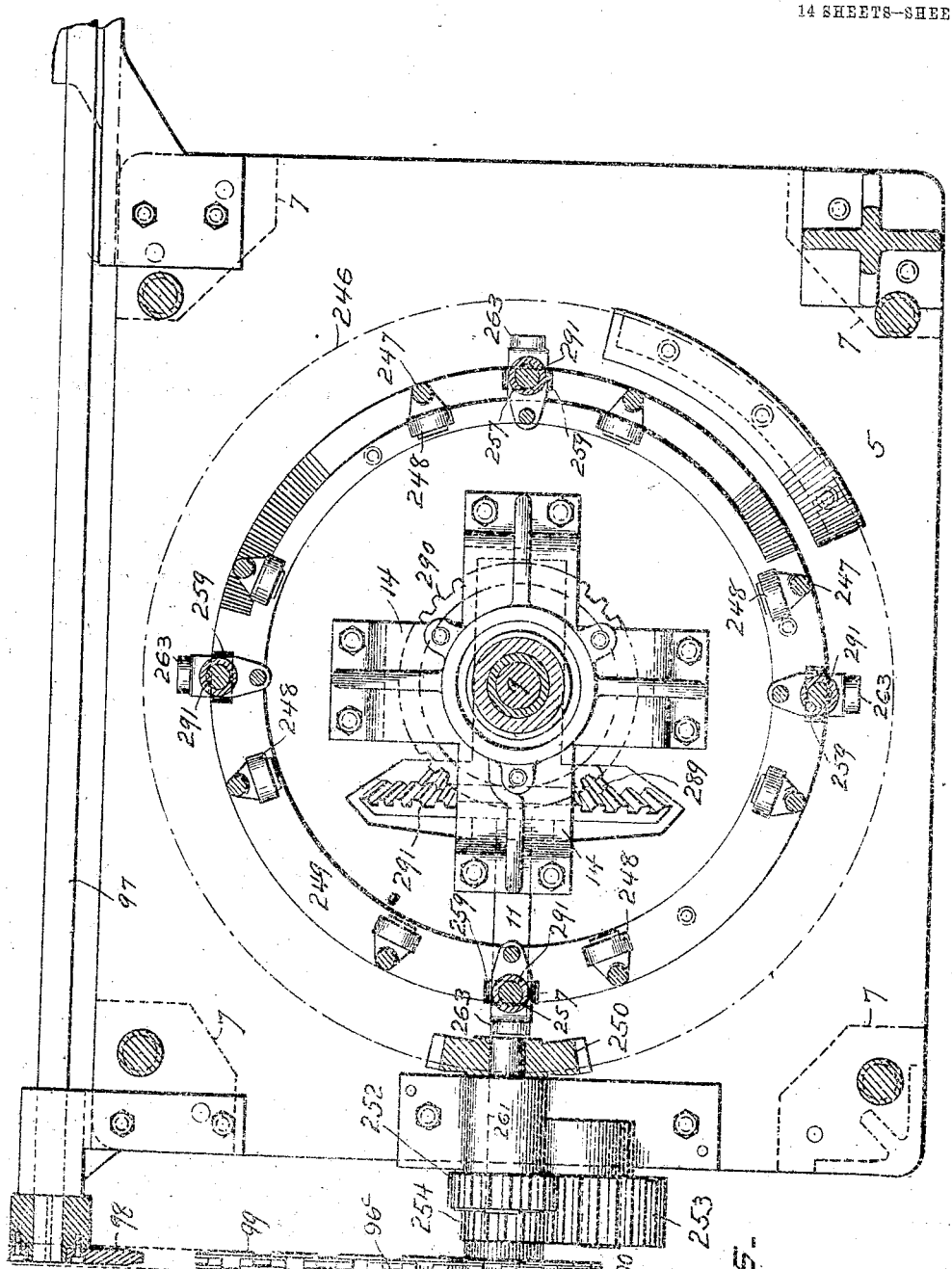

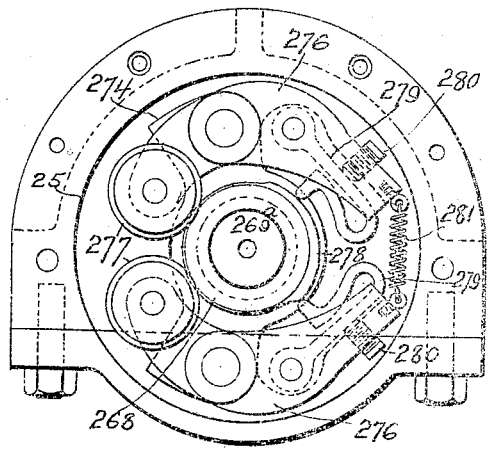
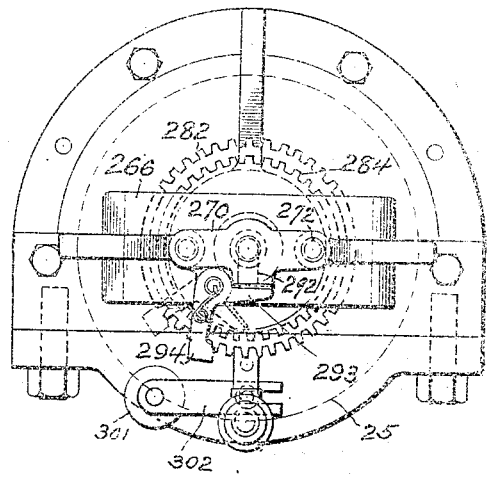
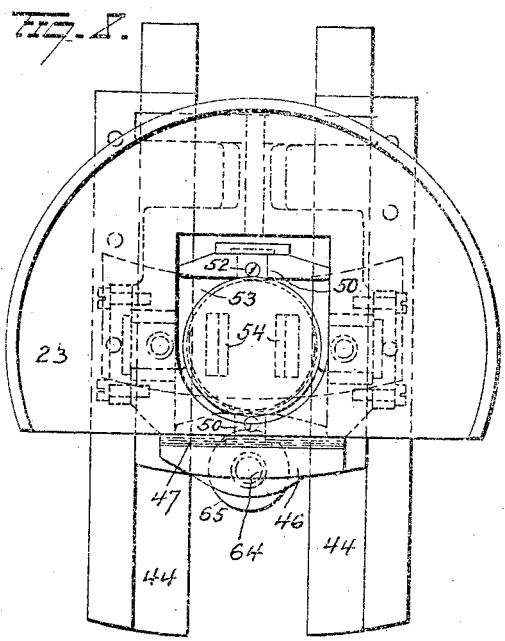
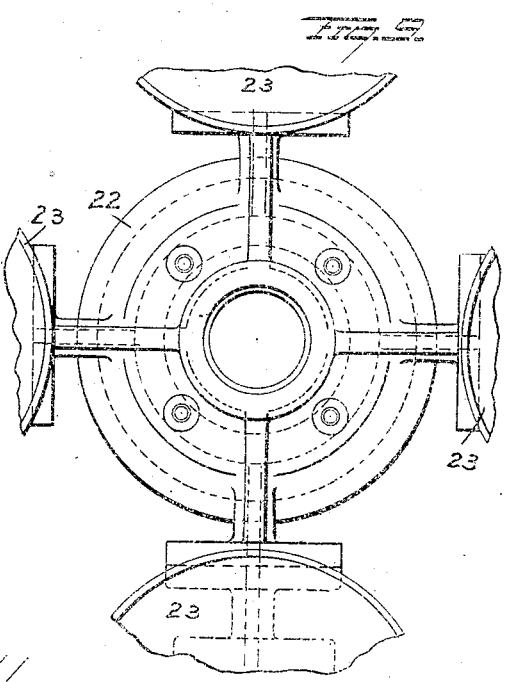
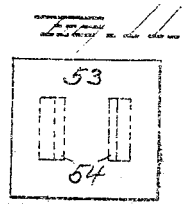

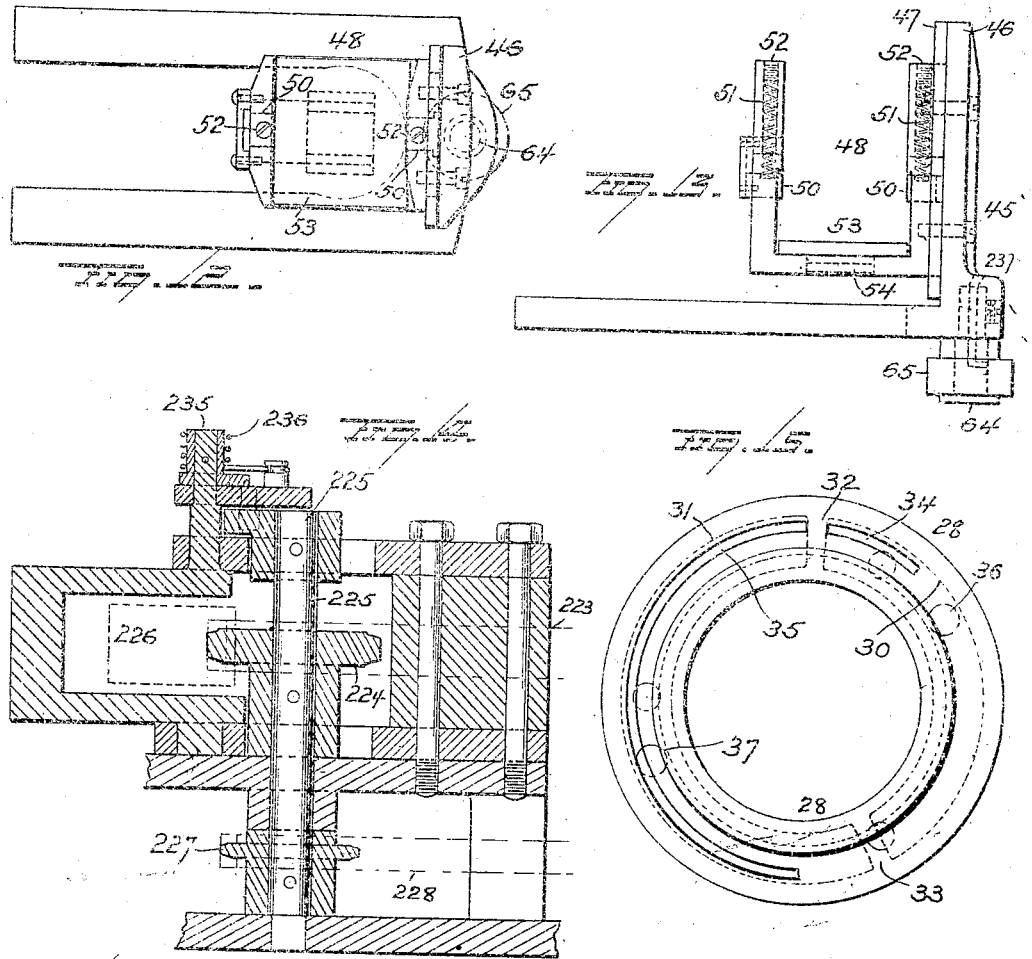
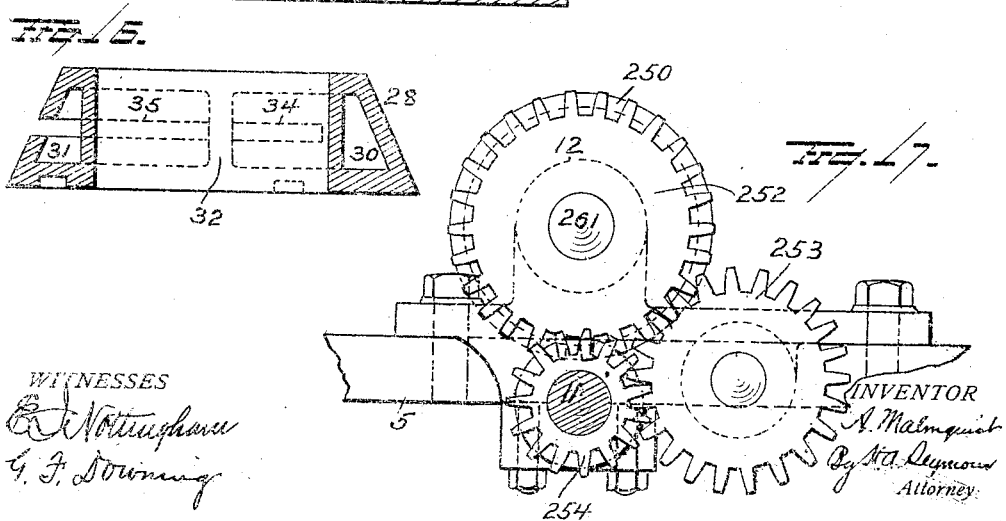

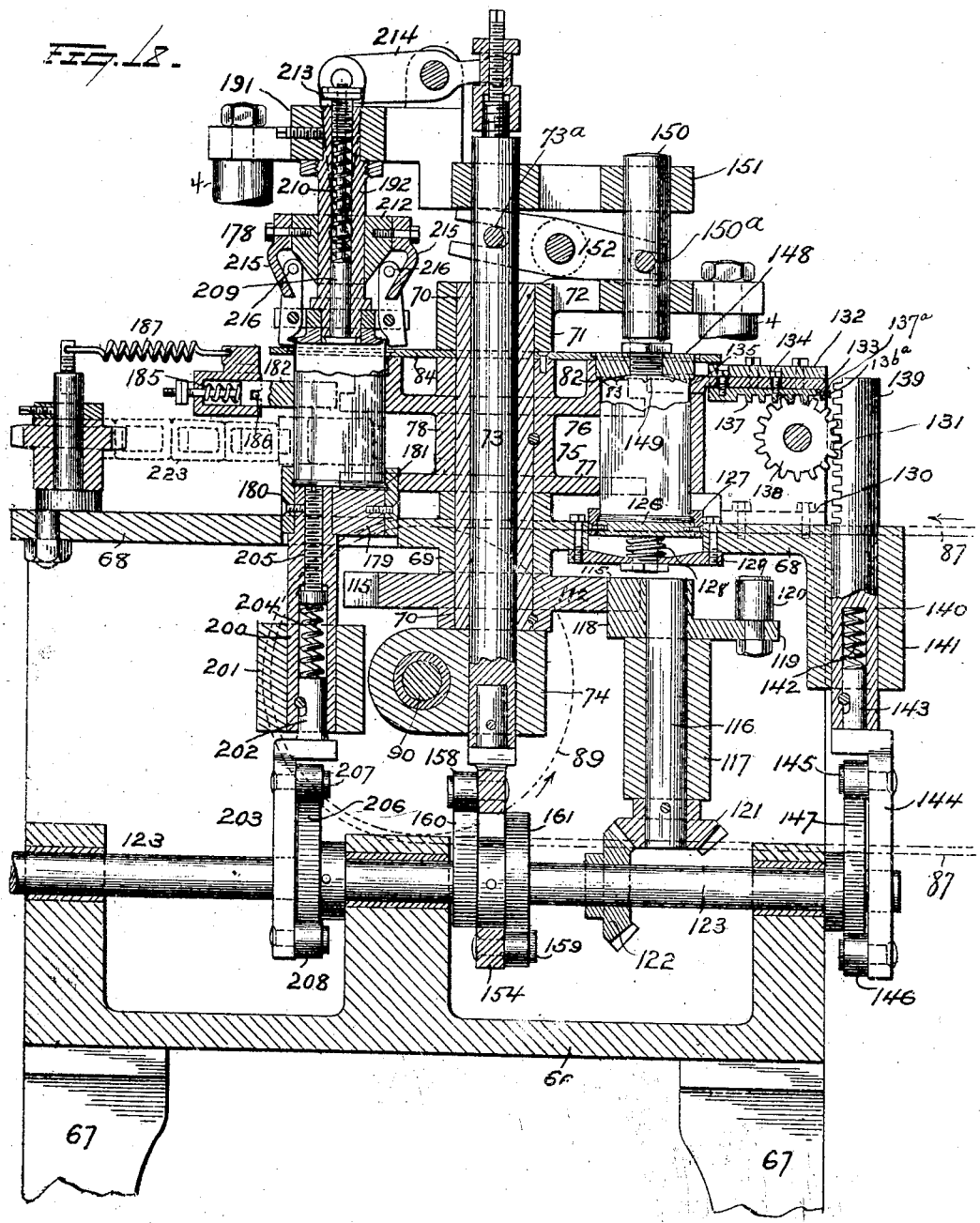

A. MALMQUIST.
CAN SEALING APPARATUS.
APPLICATION FILED APR. 2, 1913.
1,099,756.
Patented June 9, 1914.
14 SHEETS—SHEET 10.
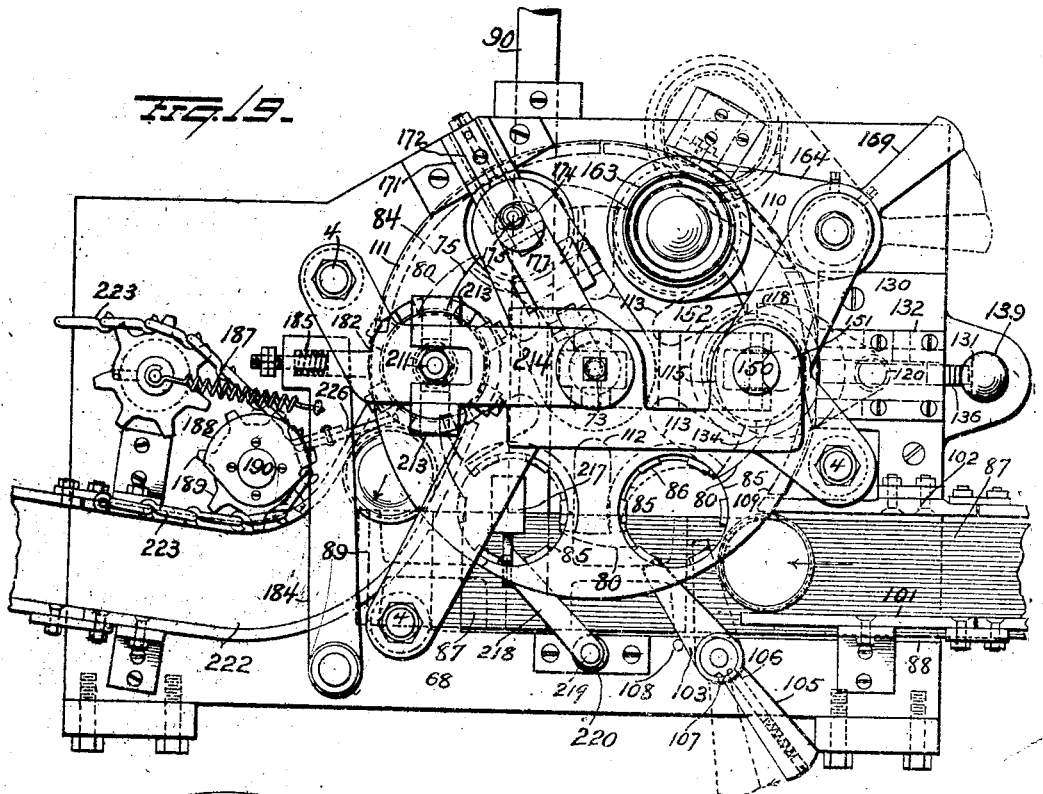
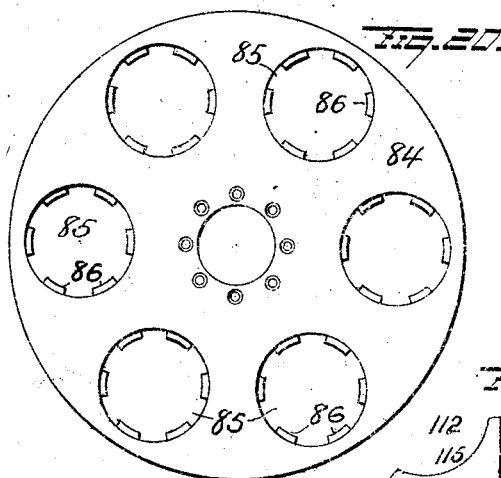
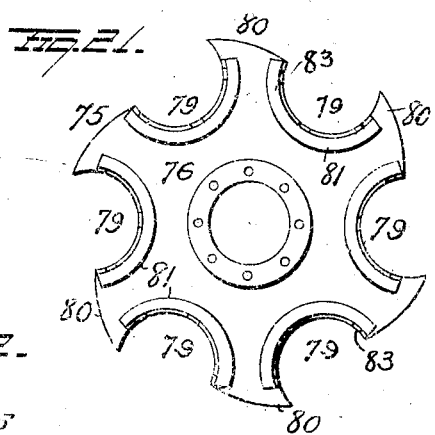
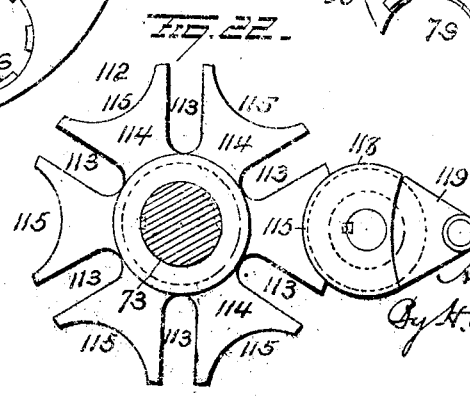
WITNESSES
E. J. Nottingham
G. F. Downing
INVENTOR
A. Malmquist
By H. A. Seymour
Attorney

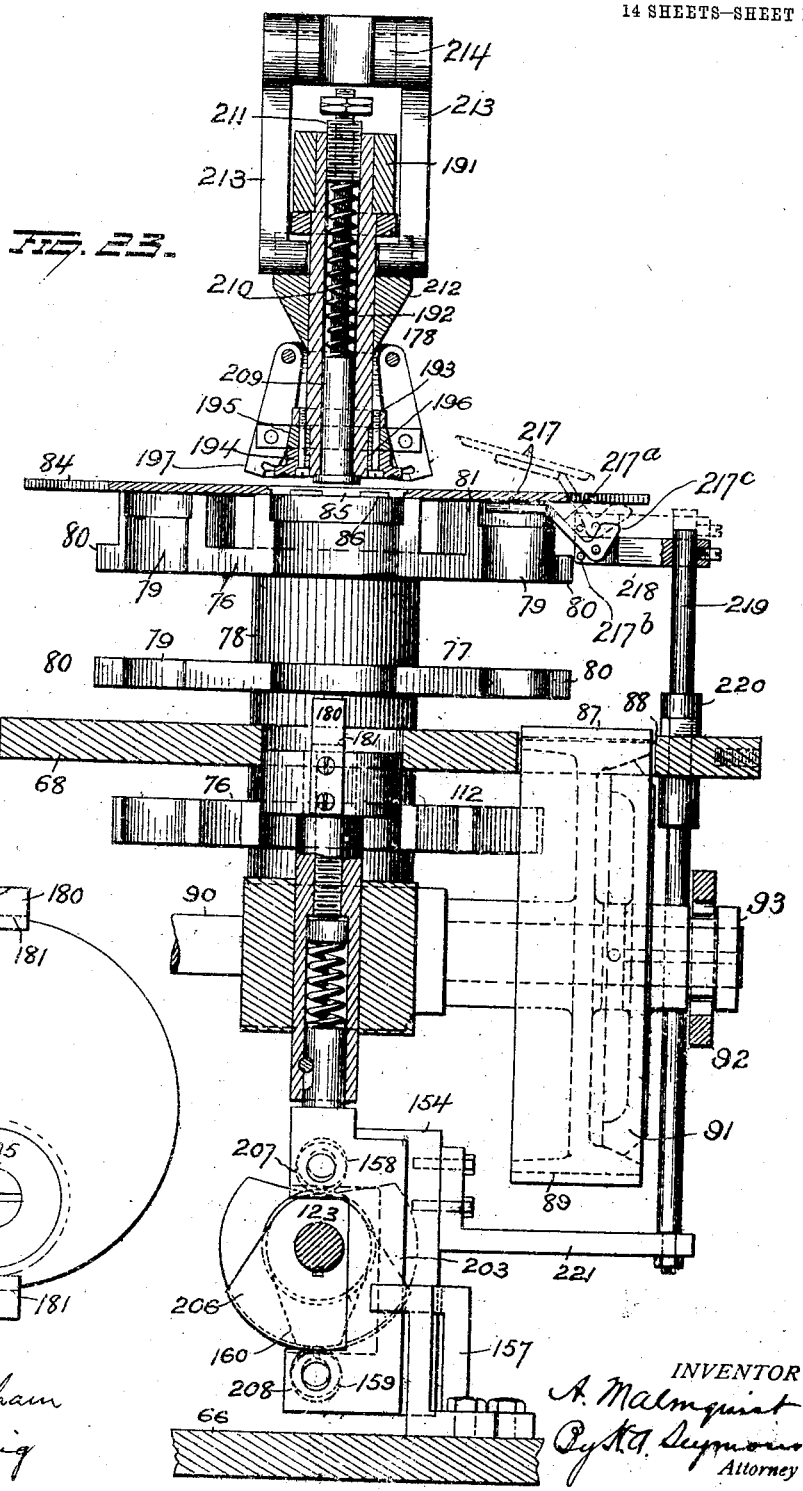

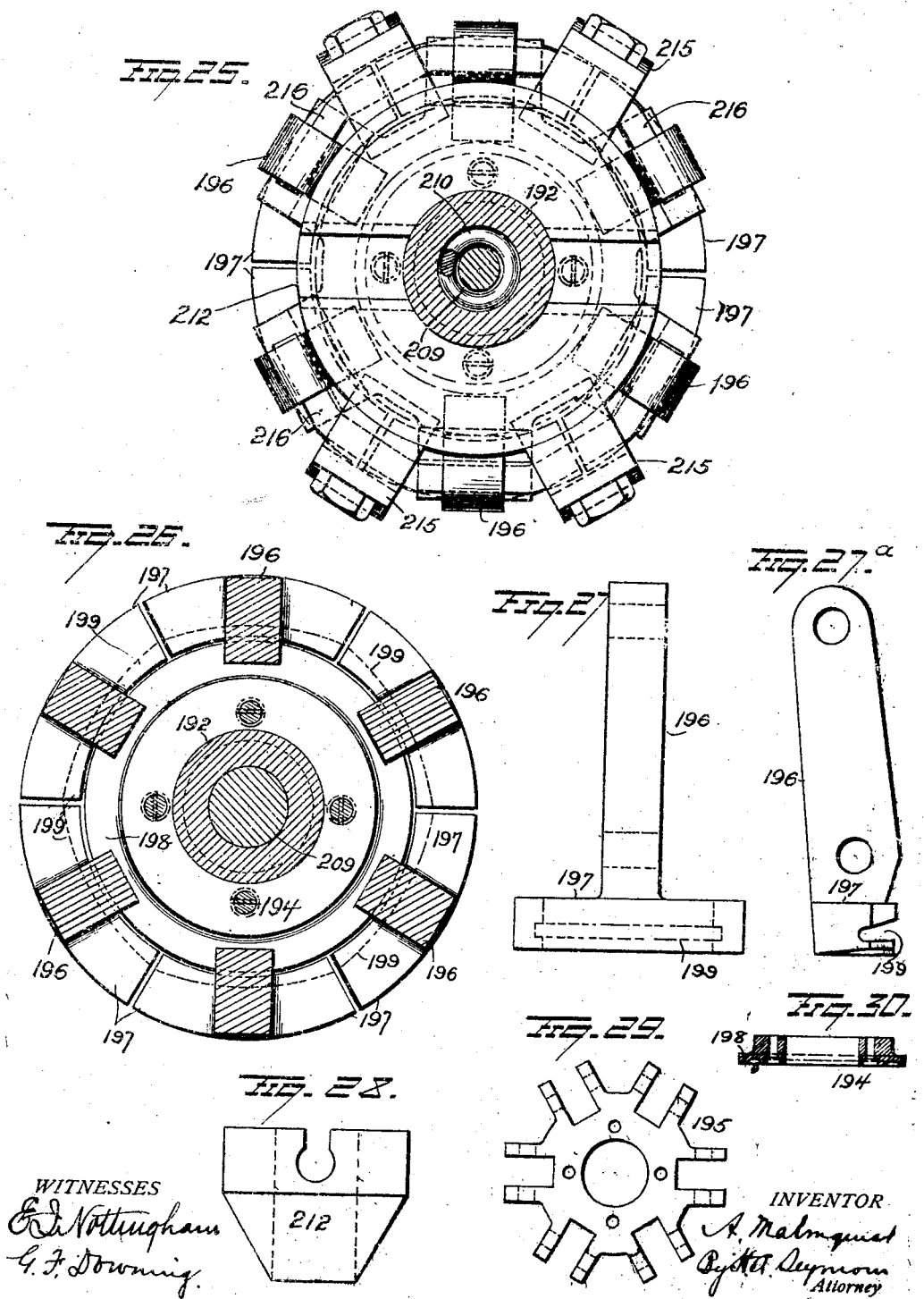

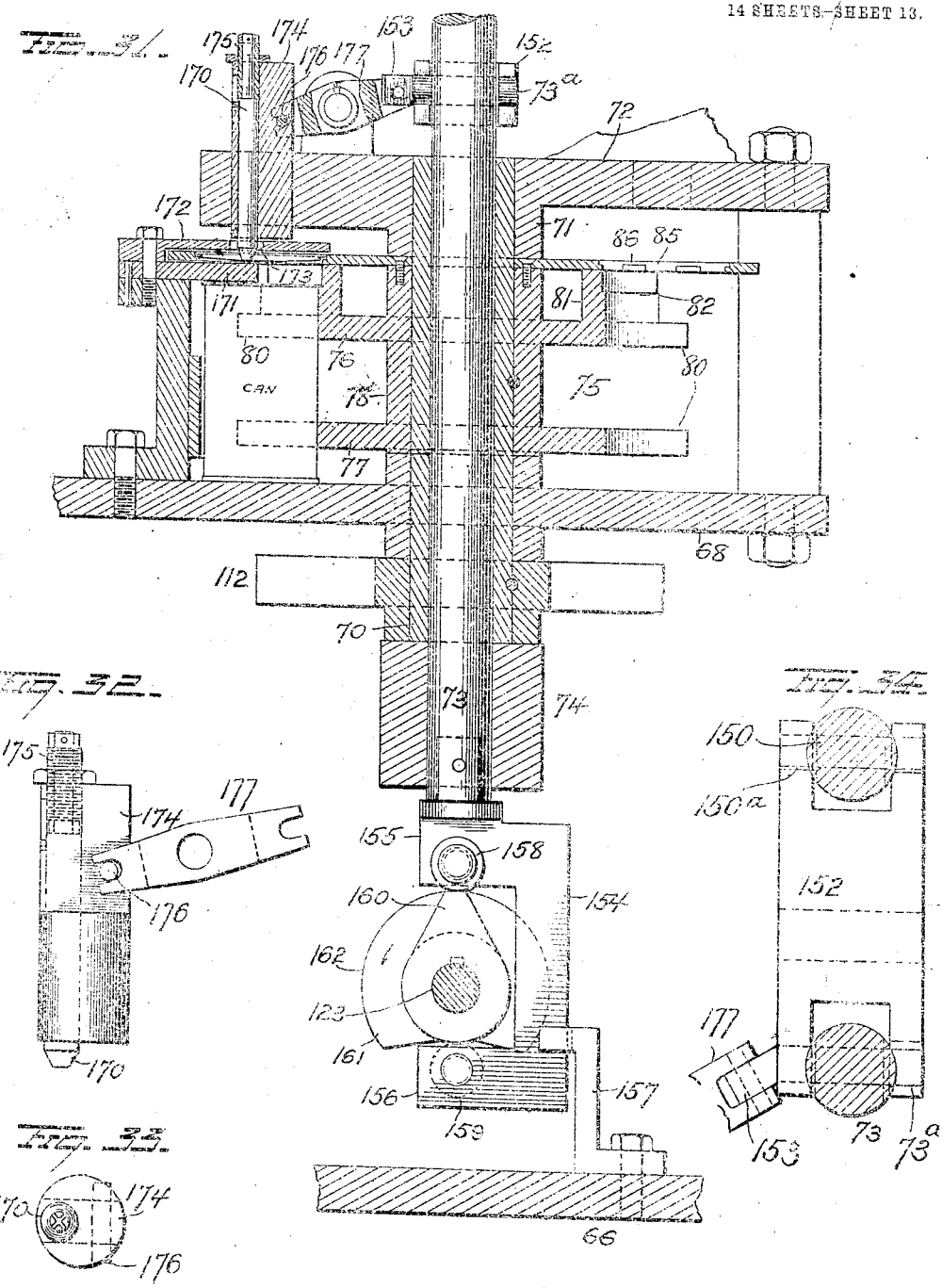

A. MALMQUIST.
CAN SEALING APPARATUS.
APPLICATION FILED APR. 2, 1913.
1,099,756.
Patented June 9, 1914.
14 SHEETS—SHEET 14.
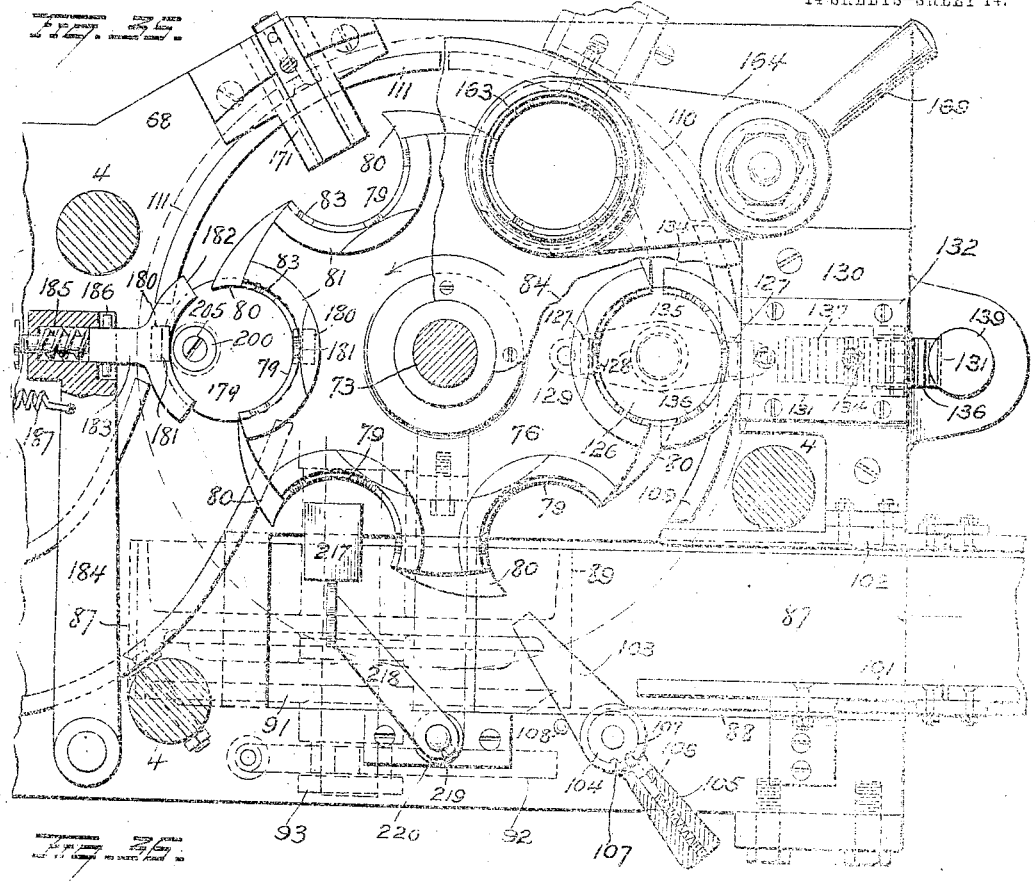
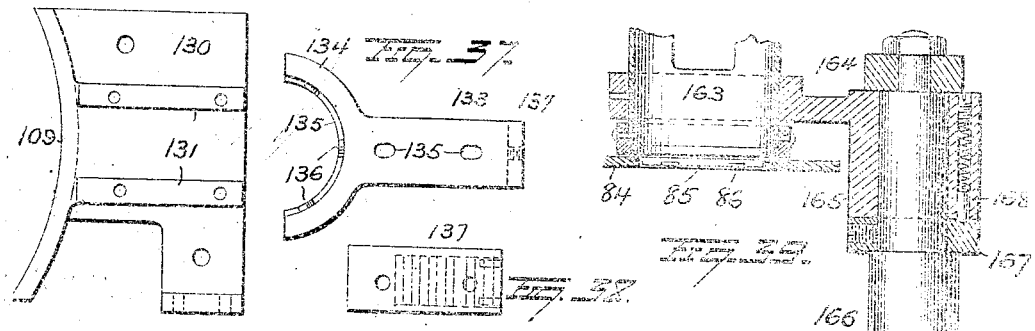
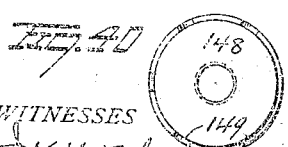
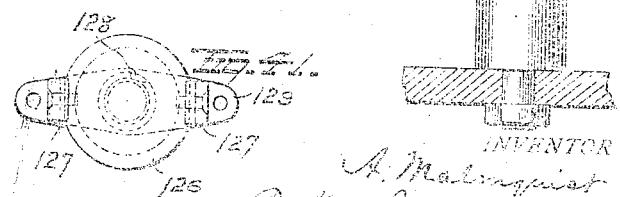

UNITED STATES PATENT OFFICE.

ADOLPH MALMQUIST, OF SOUTH BELLINGHAM, WASHINGTON, ASSIGNOR TO PERFECT VACUUM CAN COMPANY, OF CHICAGO, ILLINOIS, A CORPORATION.

CAN-SEALING APPARATUS.

1,099,756.  Specification of Letters Patent.  Patented June 9, 1914.

Application filed April 2, 1913. Serial No. 758,474.

*To all whom it may concern:*

Be it known that I, ADOLPH MALMQUIST, of South Bellingham, in the county of Whatcom and State of Washington, have invented certain new and useful Improvements in Can-Sealing Apparatus; and I do hereby declare the following to be a full, clear, and exact description of the invention, such as will enable others skilled in the art to which it appertains to make and use the same.

This invention relates to can sealing apparatus and more particularly, to improvements upon the apparatus for which Letters Patent were granted to me on the first day of October 1912, and designated by Patent No. 1,039,770,—one object of the present invention being to provide mechanism which will operate to first apply the caps or heads to the can bodies in a manner to prevent hermetic sealing of the same, and subsequently hermetically seal the caps or heads to the can bodies in a vacuous chamber.

A further object is to provide devices for crimping or indenting the flanges at the mouths of the cans and crimping the flanges of the caps or heads thereon in such manner as to prevent the caps or heads from being hermetically sealed to the can bodies before they are subjected to seaming mechanism which hermetically seals them.

A further object is to provide simple and efficient devices for preventing the feeding of imperfect cans into the mechanism.

A further object is to provide means for controlling the feed of the caps or heads.

A further object is to provide means for automatically throwing out caps or heads which have been fed when no can body has been properly placed to receive it.

A further object is to provide simple and efficient means which will operate to prevent the feeding of cans to disabled sealing mechanism.

A further object is to provide means for marking a cap or head while it is in position over a can body but before it has been attached to the latter.

A further object is to improve the mechanism in other respects as will be hereinafter more fully explained.

With these objects in view, the invention consists in certain novel features of construction and combinations of parts as hereinafter set forth and pointed out in the claims.

In the accompanying drawings; Figure 1 is a plan view of the apparatus; Fig. 1ª is a view showing piping for a plurality of machines. Fig. 2 is a sectional view (partly in elevation) of that portion of the apparatus wherein the caps are double-seamed to the can bodies; Fig. 2ª is a view showing means for controlling the operation of the sealing mechanism; Fig. 2ᵇ is a diagrammatical view illustrating the driving mechanism; Fig. 3 is an enlarged plan view, partly in section of a portion of the sealing mechanism, and shows the feeding devices therefor. Fig. 4 is enlarged vertical sectional view of one of units of the sealing mechanism and parts which coöperate therewith; Fig. 5 is a horizontal sectional view through the lower portion of the sealing mechanism, showing gearing and cams for operating said sealing mechanism; Fig. 6 is a detail bottom plan view showing the seaming devices; Fig. 7 is a plan view of the upper portion of one of the units of the sealing mechanism. Fig. 8 is a plan view showing the lower portion of one of said units; Fig. 9 is a fragmentary view showing the valve devices in the center of the sealing mechanism; Fig. 10 is a side view of one of the seaming rollers; Fig. 11 is a plan view of one of the cam blocks or supports 53; Fig. 12 is a plan view of the can carrier and closure for one of the sealing chambers; Fig. 13 is a side elevation of the structure shown in Fig. 12; Fig. 14 is a detail sectional view of devices which direct the cans to the sealing chambers; Fig. 15 is a plan view of the main valve of the exhausting means; Fig. 16 is a sectional view of said valve; Fig. 17 is an enlarged detail view of a portion of the gearing; Fig. 18 is a sectional view of the capping mechanism; Fig. 19 is a plan view of the capping mechanism; Fig. 20 is a plan view of the cap plate; Fig. 21 is a plan view of the rotary can carrier; Fig. 22 is a plan view, partly in section, of the operating means for the can carrier; Fig. 23 is a vertical sectional view, partly in elevation, of a portion of the capping mechanism, showing the crimping devices and the cap ejector; Fig. 24 is an enlarged plan view of the platform for a can under the crimping devices; Fig. 25 is an enlarged plan view (partly in section) showing the crimping devices; Fig. 26 is an enlarged horizontal transverse sectional view of the crimping devices Figs. 27 and 27ª are enlarged detail views showing one of the crimping jaws; Fig. 28 is a detail view of the cone for operating the crimper jaws; Fig. 29 is a detail view of the spider with which the crimper jaws are pivotally connected. Fig. 30 is a detail sectional view (on a reduced scale) of the crimper head 194. Fig. 31 is a sectional view of the capping mechanism showing the marking devices and operating means therefor; Fig. 32 is an enlarged detail view of the marking die and its carrier; Fig. 33 is a plan view of the structure shown in Fig. 32; Fig. 34 is an enlarged detail plan view of the lever 152, the shafts with which lever coöperates being shown in section. Fig. 35 is a plan view, with some parts removed and other parts in section, of the capping mechanism; Fig. 36 is a detail view of one of the can guides; Fig. 37 is a plan view of the can clamp 134. Fig. 38 is a view of the rack bar 137. Fig. 39 is a detail sectional view showing the cap magazine and coöperating devices. Fig. 40 is a bottom plan view of the punch or notching device, and Fig. 41 is a plan view of the can platform under the punching or notching devices of the capping mechanism.

My improved apparatus comprises mechanism 1 for hermetically sealing caps or heads to the can bodies in exhausted chambers; capping mechanism 2 for applying the caps or heads to the cans in manner as to prevent accidental displacement, but avoiding hermetic sealing, said capping mechanism also embodying means for marking the can caps or heads, and feeding and conveying mechanism 3 for receiving the capped cans from the capping mechanism and delivering them to the sealing mechanism, in which latter the caps or heads will be double-seamed to the can bodies so as to hermetically seal the cans.

The frame of the machine embodying the sealing mechanism, comprises uprights 4 rising from a platform 5 and connected at their upper ends by a spider 6. The platform 5 may be supported at a suitable elevation upon legs 7. The spider 6 is provided centrally with a bearing 8 for the upper portion of a vertical shaft 9 and the lower end of this shaft is mounted in a bearing block 10 supported in an opening in the center of the platform 5,—said block being also adapted to receive a horizontal drive shaft 11, and the latter is mounted near its outer end in a bearing bracket 12. A pulley (to receive motion from any suitable source of supply) is mounted loosely on the shaft 11 and a clutch 13ª (Fig. 2ª) is provided for securing said pulley to its shaft. A hand lever 13ᵇ, pivoted at its lower end to a fixed arm 13ᶜ, is connected with a cone sleeve 13ᵈ on shaft 11 for manipulating the clutch.

The platform 5 sustains a fixed spider 14 having a central bearing 15, through which the lower portion of a vertical tubular shaft 16 passes, a suitable bushing 17 being disposed between said tubular shaft and bearing. The tubular shaft is made with an annular enlargement 18, between which and the spider 14, anti-friction bearing balls 19 are disposed.

The tubular shaft 16 is provided with an inverted conical hood 20, and this hood is provided with a plurality of radial brackets 21 strengthened by webs 22 extending to the tubular shaft 16. The central shaft 16, hood 20, brackets 21 and webs 22, thus constitute a revoluble frame which carries several sealing chambers, as will now be explained:—To each bracket 21, a casing 23 is secured and forms, with a hood 24 thereon, a sealing chamber 25. Each casing 23 is provided with a duct 26 communicating with a duct 27 in the adjacent bracket 21 to permit the withdrawal of air from the sealing chambers. The exhausting of the sealing chambers is controlled by a hollow valve ring 28 disposed within the hood 20 and held stationary by spring pressed keys 29 mounted in the upper portion of the fixed spider 14. The valve ring 28 has a general conical form and is made with two chambers 30 and 31 isolated from each other by walls 32—33, and for these chambers, elongated ports 34—35 are provided and adapted to register with the ducts 26—27. Pipes 36—37 communicate with the respective valve chambers 30—31 and these pipes are connected with pipe lines 38—39 respectively, the latter being connected with suitable exhaust apparatus not shown. In some instances it may be desired to employ several sealing apparatus for sealing cans of different sizes in the same canning plant. In Fig. 1ª of the drawing, piping for two such apparatus is shown. The pipes 36—37 for each sealing apparatus are provided with manually operated valves 38ª—39ª and with pressure valves 40—41. The pipe lines 38—39 are also provided with valves 42—43 in proximity to the connections of the pipes 36—37 with said pipe lines. With such arrangement any sealing machine of the plant, may be cut out of service, in the event it becomes disabled or for other reason. Guideways 44 are located under each casing 23 for the accommodation of a sliding carrier 45, the vertical wall 46 of which constitutes a closure for the vacuum sealing chamber 25 when the parts are in the position shown at the left of Fig. 2, and said wall 46 is provided with packing 47 so that the sealing chamber will be closed air tight. To the vertical wall 46 of the carrier, a can receptacle 48 is secured and the diametrically opposite walls of this receptacle are provided with slots 49 for the accommodation of vertically movable blocks or dogs 50 adapted to engage the can at diametrically opposite sides. These dogs are normally held in place by means of springs 51 housed in sockets in the walls of the can receptacle, the upper ends of said springs bearing against screws 52, by means of which their tension may be adjusted. A vertically movable platform 53 is disposed in the bottom of each can receptacle 48 and provided with lugs 54 (L-shaped in cross section) which enter an opening in the bottom of the receptacle, as clearly shown in Figs. 2, 4 and 13. The platform 53 constitutes a support for a can and when the can is within the sealing chamber, its lower flange will be engaged by two dogs 55. These dogs also engage the can at diametrically opposite sides (at right angles to the dogs 50) and co-operate with the dogs 50 to hold the can in proper position within the sealing chamber. The dogs 55 are also vertically movable (slots or guideways 56 being provided in the walls of the sealing chamber to permit such movement) and said dogs 55 are pressed downwardly by means of springs 57 housed in the walls of the sealing chamber, so as to insure the retention of the can on the platform 53.

In a plane below one of the sealing chambers and projecting laterally beyond the same, is an approximately V-shaped cam-way 58, the apex of which is made somewhat blunt or slightly elongated as shown at 59, Fig. 3. The outer wall 60 of the forward leg of the V-shaped cam 58 is hinged at 61 and provided at its free rear end with an arm 62, to which one end of a spring 63 is attached, the other end of said spring being connected with the stationary framework. The outer wall of the forward leg of the cam-way 58 is thus made so that it can yield, for a purpose which will hereinafter appear.

The combined can carrier and closure for each sealing chamber is provided near its outer end with a depending pin 64 (Figs. 2 and 13) carrying a roller 65 adapted to move through the V-shaped guideway 58 and thus effect the sliding movement of the can carrier 45 to move the can into or out of a sealing chamber and to open and close said sealing chamber, during the travel of the revoluble frame of the machine.

While a can is in a vacuum sealing chamber, the cap or cover will be double-seamed to the can body, as will be hereinafter explained. It is desirable however, that the caps or covers shall have been previously applied to the can bodies in a manner to prevent their displacement, but it is important that such capping of the cans shall not hermetically seal the latter,—the hermetic sealing being effected while the can is in a vacuum sealing chamber.

The mechanism for capping the cans without hermetically sealing them, and then feeding them to the sealing chambers and then double-seaming the caps to the cans to hermetically seal them, will now be described in detail. The framework 66 of the capping mechanism is supported on legs 67 and constructed with a horizontal platform 68. The platform is provided centrally with a bearing 69 for a vertical tubular shaft 70, a bearing for the upper portion of said tubular shaft being afforded by a sleeve 71 on arm 72 secured to the upper portion of the framework. A vertical shaft 73 passes freely through the tubular shaft 71, (so as to be vertically movable therethrough) and projects at both ends beyond the same, the lower portion of said shaft 73 also having a bearing in a block 74 rigid with the framework.

A rotary can carrier 75 comprising superimposed annular disks 76—77 connected by a hub 78, is keyed to the tubular shaft 70. Each disk 76—77 is made with a plurality of approximately semi-circular recesses 79 to receive cans to be capped and at the rear end of each of these recesses, the metal of the disk is made to project farther than the metal at the other end of the recess and forms fingers 80, the forward edges of which constitute continuations of the wall of the partly circular recesses 79 and serve to insure forward movement of the cans when the carrier is turned. The upper disk 76 is provided with an upwardly-projecting curved flange at the edge of each recess 79 and the upper portion of each flange 81 is reduced somewhat in thickness, forming a shoulder 82, as shown in Figs. 18, 21, 23 and 31, to receive the flange at the upper end of a can, (Fig. 18) and this shoulder is notched at intervals, as indicated at 83, Figs. 18, 21 and 31, to accommodate notches in the flanges of the cans as hereinafter explained.

A circular plate or cap carrier 84 (Fig. 20) is secured to the upper end of the hub 78 of can carrier 75 and projects over the latter. The plate or cap carrier is made with a plurality of circular openings 85, into each of which, a plurality of lugs 86 project and constitute supports for can caps or covers, as illustrated, (for example) in Fig. 31.

Cans (without caps or covers) are fed from any suitable source, to the can carrier 75, by means of a conveyer 87 (Figs. 1, 2ᵇ, 18 and 35),—the platform 68 being slotted as at 88 (Figs. 23 and 35) for the accommodation of this conveyer and the pulley 89 over which it passes and from which it received motion. A suitable can-cleaning device 89ᵃ may be located in the path of the conveyer 87 for the purpose of cleaning the exterior of the cans before they reach the capping mechanism. The pulley 89 is mounted loosely on a shaft 90 having a mounting in the bearing block 74 and said pulley is thus so located that the conveyer will be in such proximity to the rotary can carrier 75 as to direct cans near the recessed disks thereof. A clutch 91 (Figs. 23—35) is provided for securing the pulley to the shaft 90 so that the motion of the latter may be transmitted to said pulley for operating the feeding conveyer 87. A hand lever 92 is provided and connected with a sleeve 93 for operating the clutch 91. The shaft 90 projects beyond the frame 66 of the capping mechanism and carries a sprocket wheel 94 over which a sprocket chain 95 passes, the latter receiving motion from a small sprocket wheel 96 on a shaft 96$^a$ mounted in suitable bearings on the framework of the sealing mechanism, (Fig. 2$^b$). The shaft 96$^a$ also carries a sprocket wheel 96$^b$, from which a sprocket chain 96$^c$ passes to a small sprocket 96$^d$ which is rotatable with the pulley 13 on shaft 11. The shaft 97 is mounted in suitable bearings on the frame of the sealing mechanism and carries a sprocket wheel 98 to which motion is imparted by a chain 99 from a sprocket wheel 100 on the main driving shaft 11 when the clutch 13$^a$ is in position to lock the pulley 13 to said shaft.

It will be understood, as more fully hereinafter described in detail, that motion is derived from the shaft 11 for operating the sealing mechanism 1, the feeding devices 223–226 and the capping mechanism and that the operation of this shaft is under the control of the manually operated clutch 13$^a$. The gearing for effecting the operation of the feeding conveyer 87, however, receives power directly from the pulley 13$^a$ (the sprocket 96$^d$ being secured to rotate with said pulley) and hence the operation of the sealing mechanism and its feed mechanism, and the capping mechanism may be stopped by manipulating the clutch 13$^a$, without effecting the operation of the feeding mechanism which carries the cans through the cleaner to the capping mechanism. By reference to Fig. 2$^b$, it will be observed that motion is imparted from the sprocket 96$^d$ on pulley 13, to the sprocket 96$^b$ through the medium of chain 96$^c$, and that motion thus imparted to the shaft 96$^a$, is transmitted, by the sprocket and chain 95 to the sprocket 94 on shaft 90, thus driving the conveyer 87. The operation of the latter may be stopped by manipulating the clutch 91 as previously explained. Adjacent to the sides of the conveyer 87, fixed upright guides 101—102 are located and near the free end of the outer guide 101, an arm 103 is mounted on a post 104 on the platform 68, and projects partially over the conveyer 87 in a diagonal direction. The arm 103 is provided with a handle 105 carrying a spring pressed dog 106 to engage one or another of the notches 107 in the post 104 and hold the arm 103 in the position to which it may be moved. When the arm 103 is in its normal position shown in Fig. 35, it will bear against a fixed stop 108 on the platform 68, and thus constitute deflecting means to direct the cans from the conveyer 87 to the rotary can carrier 75. Should it become desirable, for any reason, to stop the feed of cans to the capping mechanism (without stopping the conveyer 87) this may be readily accomplished by shifting the position of the deflecting arm 103 so that it will project directly across the can path and thus operate as a stop arm for the cans, as shown in dotted lines in Fig. 19. A plurality of curved guides 109—110 and 111 are provided on the platform 68 and are arranged concentric with the axis of rotation of the rotary can carrier 75,—said guides being so spaced from the can carrier that the distance between each of said guides and the bottom of the recesses 79 of the disk 77 will be approximately equal to the diameter of a can.

The can carrier will be rotated step by step, so that the cans may be caused to remain a sufficient length of time at each of the several positions where certain manipulations are to be accomplished, as hereinafter explained. To effect such step-by-step rotation of the can carrier, the devices now to be described, may be employed.

A disk or wheel 112 (Fig. 22) is secured to the lower end of the tubular shaft 70 and is made with a plurality of slots 113, thus forming an equal number of arms 114,— each of which latter is made with a curved recess 115 in its free end. A vertical shaft 116 is mounted in a bearing sleeve 117 in the framework (Fig. 18) and carries a cam-head 118 having an arm 119 provided with a roller-pin 120. Somewhat more than one-half of the head 118 is curved concentric with the axis of rotation of said head and the shaft 116, and is adapted to turn freely in the curved recess 115 of any one of the arms 114 of disk 112, as clearly shown in Fig. 22. It will be understood that while the head 118 bears the relation to the disks 112 shown in Figs. 18 and 22, the rotary can carrier will be at rest, but that when the shaft 116 shall have turned sufficiently to cause the roller-pin 120 to enter an adjacent slot 113 of the disk 112, motion will be imparted to the latter and the can carrier 75 will be turned until the partly circular portion of the head enters the curved recess 115 of the next arm 114 of disk 112, when said can carrier will have accomplished one step in the course of its rotation. For the purpose of effecting continuous rotation of the shaft 116, the latter is provided at its lower end with a beveled gear 121 receiving motion from a bevel pinion 122 on a shaft 123 mounted in suitable bearings on the framework 66. The shaft 123 projects over a beam 124 which connects the frame of the capping mechanism with the frame of the sealing mechanism (Fig. 1) and is provided with a bevel gear 125 receiving motion from a bevel pinion 125ª on the shaft 97.

A can having been fed to the rotary can carrier, it will be moved, during one step of the rotation of the carrier, onto a circular disk or platform 126 disposed in an opening in the platform 68 of the capping machine frame, and the lower flange of the can will become disposed under dogs 127 secured to the disk or platform 126, as shown in Fig. 18. The disk 126 is normally sustained by a spring 128 disposed between said disk and a bar or yoke 129 secured to the frame platform 68.

A bracket 130 is secured upon the frame platform 68 in proximity to the can disk or support 126 and the curved guide 109 may be made an integral part of this bracket as shown in Fig. 36. The bracket 130 comprises parallel upright plates 131—131, the upper ends of which are covered by a cap plate 132. Between the upper portions of the plates 131 and directly under the cap plate 132, a horizontally disposed arm 133 is disposed, said arm being provided at one end with a curved clamping head 134 at the upper end of the guide 109, to partially embrace the can and coöperate with the rotary carrier 75 to hold said can in place. The curved clamping head is provided with a shoulder 135 having notches 136, similar to the shoulders 82 and notches 83 of the rotary can carrier 75. A rack bar 137 is adjustably secured to the under face of the arm 133 by means of screws 134 passing through slots 135 in arm 133 and entering said rack bar. Adjustment of the rack bar may be effected by means of a screw 136ª passing through a threaded hole in a lug 137ª at the rear end of arm 133 and engaging the rear end of the rack bar. The rack bar 133 is engaged by a pinion 138 mounted between the plates 131 of bracket 130 and receives motion from a vertically movable rack bar 139. This rack bar is made with a depending extension 140 mounted to move vertically through a sleeve 141 made rigid with the framework, and the lower portion of said extension is made with a socket in which a spring 142 is located. A shank 143 has a limited movement in the socket in the extension 140 and bears against the spring 142. The shank 143 is carried by a vertically movable yoke 144 provided with roller pins 145—146 to engage a cam 147 on the shaft 123, so that when said shaft is turned, the rack bar 139 will be vertically reciprocated for the purpose of moving the clamping head 134 toward or away from the upper portion of the can resting on the support 126. Thus it will be seen that when a can reaches the disk or support 126, the clamping head 134 will be moved forwardly to engage the can as shown in Fig. 18, and by the provision of the yielding connection afforded by the spring 142, excessive pressure of the clamping head against the can will be avoided. When the can shall have been positioned as shown at the right of Fig. 18, the flange at its upper edge will be provided with a plurality of outward depressions to render said flange uneven, so that when a cap is crimped on the can as hereinafter explained, a plurality of ducts will be formed between the cap and the flange of the can, and thus, hermetic sealing of the can in the capping mechanism will be prevented. The notching or denting of the flange of the can is effected by means of a die-head 148 which passes through an opening in the top plate or carrier 84 and presses the flange of the can onto the shoulders 82 and 135 of the carrier 75 and clamping head 134 respectively, said die head being provided with a plurality of small projections 149 (Fig. 18) over the notches in said shoulders, for the purpose of notches in said shoulders for the purpose of notching or denting the flange of the can as above explained, and when this notching or denting is being effected, danger of crushing or injuring the can will be avoided by reason of the yielding disk or support 126 on which the can rests.

The die-head 148 is carried by a vertical mandrel 150 passing through suitable holes in arms 72 and 151 of the framework. A lever 152 (Figs. 18, 19 and 34) is pivotally supported between its ends and slotted at its ends for the accommodation of the shaft 73 and the mandrel 150, to both of which said lever is pivotally connected by pins 73ª and 150ª. The pin 73ª projects at one end beyond the lever 152 and is bent as shown at 153 for a purpose which will be hereinafter explained. To the lower end of the shaft 73, a yoke 154 is secured, the parallel arms 155—156 of said yoke projecting, respectively, over and under the shaft 123. Suitable guides 157 for the yoke 154 are secured to the framework. A roller pin 158 is mounted on one side of the yoke arm 155 and a roller pin 159 is mounted on the opposite side of the yoke arm 156, and these roller pins are engaged, respectively by cams 160 and 161 secured to the shaft 123. The cam 160 is of such shape that it will coöperate with the roller pin 158 during a limited part of a complete rotation of the shaft 123, to raise the shaft 73 and transmit motion through the lever 152 to the mandrel 150 of die head 148, thus imparting to said die head, an abrupt downward thrust to effect the notching or denting of the flange of the can as previously explained. When the blow of the die head 148 shall have been struck, the cam 161 will engage the roller pin 159 to depress the yoke 154 and return the parts to their normal positions, in which positions they will be maintained at rest during the movement of the extensive concentric edge 162 of cam disk 161 in contact with the roller pin 159. After the notching or denting of the can flange shall have been effected, the clamping head 133 will be withdrawn by the action of the cam 147 and the operating devices between said cam and the clamping head, and the can carrier will be moved another step of its rotation, by the operation of the devices shown in detail in Fig. 22, as previously explained. During this next step in the rotation of the can carrier 75, the can will be moved from the disk or support 126 and delivered under a cap magazine 163 shown in Figs. 1, 19, 35 and 39. When the can reaches this position a can cap or cover will drop from the magazine into an opening 85 in the cap carrier 84 and rest at its edge upon the lugs 86.

The cap magazine is carried by an arm 164 (Figs. 19, 35, 39) and this arm is provided with a hub or sleeve 165 mounted on a post 166. A collar 167 is secured to the post between a shoulder thereon and the lower end of the hub or sleeve 165, and the latter carries a spring-pressed dog 168 to engage the notched upper face of the collar 167 for holding the magazine in position. The hub or sleeve 165 is provided with a handle 169 for turning it, to move the magazine out of operative position (as shown in dotted lines in Fig. 19) should it be desired for any reason to stop the feeding of can caps. A cap having been deposited in the cap carrier 84 directly over the can, the carrier will move another step of its rotation, and the can and cap will become positioned under a marking die 170,—the cap still resting on the lugs 86 of the cap carrier, as shown in Fig. 31. The purpose of this die is to indent some identifying letter, figure or symbol on the can cover. When the can and cap arrive at the marking devices as shown at the left of Fig. 31, a platen or anvil 171 secured to the framework, will become disposed between the can and the cap, and a fixed plate 72 projects over a portion of the cap carrier 84 and the cap therein. This plate is provided with a hole 173 through which the lower end of the die passes. The die 170 is mounted in a die-carrier 174 and is adjustable therein by means of a screw 175. The die carrier is provided with a pin 176 to receive one bifurcated arm of a lever 177, the latter being pivotally supported between its ends and its other arm bifurcated and pivotally attached to the projecting end 153 of the pin 73ª at one end of lever 152, as shown in Figs. 31, 32 and 34. From this construction, it will be readily understood that when the shaft 73 is raised to operate the devices for notching or denting the upper flange of a can body as previously explained, the lever 177 will also be operated to actuate the die 170 to mark the cap for another can. The die 170 having been operated to mark the can cap, the rotary carrier will be again moved the distance of another step in its rotation, and the can and its cap (the latter still supported in the cap carrier 84) will be positioned for the crimping mechanism 178. When the can reaches this position, it will become disposed upon a block or support 179 (Figs. 18 and 24), which is vertically movable through an opening in the frame platform 68 and is provided at two points with fixed dogs 180 to engage the lower portion of the can body, said dogs having grooves 181 to receive the flange at the lower end of the can body and thus prevent the latter from rising off the block or support 179. To hold the can in proper position in the can-carrier during the crimping of the cap to the can, a curved clamping head 182 is provided, to engage the can body as shown in Figs. 18 and 35. This clamping head is provided with a shank 183 passing transversely through the socketed end of an arm 184, the socket of said arm containing a spring 185 which serves to cause the clamping head to engage the can with yielding pressure, and the said shank of the clamping head is also provided with pins 186 entering notches in the arm 184 to prevent the curved clamping head from turning. The arm 184 which carries the yielding clamping head as above described, is pivoted to the framework and is movable in a direction to move the clamping head away from the can, by means of a spring 187. When a can reaches the crimping mechanism, the arm is moved, to cause the clamping head to engage the can, by means of a cam 188 (Fig. 19) secured to rotate with a sprocket wheel 189 on a shaft 190.

The upper framework is made with an arm 191 (Fig. 18), to which the tubular shaft 192 of the crimping mechanism is secured and through which said shaft passes. The tubular shaft 192 depends from the arm 191 and is provided near its lower end with a collar 193. A head or plunger 194 is applied to the lower end of the shaft 192 and is of suitable configuration to engage the upper face of the can cap. A spider 195 is mounted on the tubular shaft 192 between the collar 193 and the head 194, and said spider and head are secured in place by screws 196 which pass through the same and enter threaded holes in the collar,—thus securing said spider and head to the shaft 192. The spider 195 serves to pivotally support the arms 196 of a plurality of crimping jaws 197. Each crimping jaw is elongated and located in proximity to the flanged edge 198 of the head 194, and each jaw is made with a groove 199 (Fig. 27) which is so curved as to mark an arc which is eccentric to the axis of the shaft 192, and which is therefore also eccentric to the flanged edge 198 of head 194 and also to the periphery of the can and cap. With such construction of crimping jaw, the flange of the cap will not be bent closely throughout the full extent of its peripheral edge, to the flanged upper edge of the can body, and the ducts formed by the denting of the flange of the can body, as previously explained, will not be disturbed and hence the crimping of the cap to the can body in such manner as to hermetically seal the can will be effectually prevented.

When the can arrives at the crimping mechanism, the can body will be disposed below the cap carrier 84, and the cap will be resting upon the lugs 86 in one of the openings 85 of said can carrier. It is therefore necessary to raise the can so that its upper end can pass through the opening 85 of the cap carrier in order to receive the cap from said carrier. The means employed to thus raise the can will now be explained: A tubular arm 200 is secured to and depends from the block or support 179 and passes through a guide 201 rigid with the framework. The shank 202 of a yoke 203, enters and is movable a limited distance in the lower end of the tubular arm 200. A spring 204 (housed in said tubular arm) bears at one end against the shank and at the other end against a screw 205, by means of which latter, the tension of the spring 204 may be adjusted. In this manner, yielding connecting means will be afforded between the block or support 179 and a cam 206 on the shaft 123,—the yoke 203 being provided with roller pins 207—208 to coöperate with said cam to effect the raising and lowering of the can. When the can has been raised by the operation of the cam 206, said can will engage the cap and move the same upwardly until said cap engages the head 194 and the peripheral edge of said cap will be in position to be engaged by the crimping jaws, to crimp the cap to the can body as previously explained and as shown in Fig. 18. A plunger 209 is located in the tubular shaft 192 and the head of this plunger is engaged by the can cap when the latter is raised with the can, to raise said plunger against the resistance of a spring 210 housed within the tubular shaft 192. The tension of this spring may be adjusted by means of the screw 211 in the upper end of the tubular shaft 192.

The crimping jaws are operated to crimp the cap to the can, by means of a cone 212 mounted to slide on the shaft 192 and engage the upper ends of the arms of said crimping jaws. The cone 212 is engaged by pins at the lower ends of the arms of a yoke 213 and this yoke (Fig. 23) is pivotally connected with one arm of a lever 214 (Fig. 18), the other arm of said lever being adjustably connected with the upper end of shaft 73. The cone 212 has secured to its upper end, a plurality of fingers 215, which are so disposed that their inner faces will be engaged by pins 216 projecting from the arms of the crimping jaws, when the cone is moved upwardly, for the purpose of withdrawing said jaws. When the shaft is moved upwardly by the cam 160 as previously explained, motion will be imparted, through the medium of the lever 214 and the yoke 213 to the cone 212 for operating the jaws 197 to crimp the edge of the cap to the flange of the can, as shown in Fig. 18. During the downward movement of the shaft 73 motion will be imparted to the cone 212 to raise the same and cause the withdrawal of the crimping jaws. The edge of the cap having been crimped over the flange of the can, the diameter of said cap will have been sufficiently reduced to permit said cap to descend with the can through the opening 85 of the can carrier 84,—such descent of the can being effected by the operation of the cam 206 to move the block or support 179 downwardly to its normal position.

It may sometimes happen that a can will not enter the can carrier at the proper time (as when the feeding of the cans is stopped to remove a defective can or for some other reason) and consequently, a can cap might be deposited in one of the openings of the cap carrier 84 when no can is in position to receive such cap. When this occurs, it is necessary that such cap shall be removed from the cap carrier, before that portion of the can carrier 75 under this idle cap shall reach the position where it is to receive a can from the conveyer 87,—otherwise two caps may subsequently occupy the same opening of the cap carrier. For this purpose, an ejector 217 is produced. This ejector is provided with an L-shaped arm 217$^a$ (Fig. 23), pivotally supported at the juncture of its two members, by an arm 218 adjustable on a vertical rod 219. A pin or stop 217$^b$ is provided on the arm 218 to be engaged by the arm 217 to retain the ejector normally in a horizontal position, and the upwardly projecting member of the L-shaped arm 217$^a$ constitutes a toe 217$^c$ to engage the under face of the plate 84 when ejector is raised by the vertical movement of the rod 219. The rod 219 is vertically movable through a suitable sleeve 220 passing through the frame platform 68, and the lower end of said rod is attached to one end of an arm 221,—the other end of said arm being secured to the yoke 154. From this construction, it is apparent that when the yoke 154 is moved upwardly, the ejector will be raised vertically through an opening 85 of the cap carrier and if said opening contains a cap, the same will be raised vertically until the toe 217ᶜ engages the plate 84; when the further upward movement of the arm 218 and rod 219 will cause the ejector to be suddenly tilted and throw the cover from the machine.

When a cap has been crimped to a can body and the block or support 179 (Fig. 18) has been lowered to its normal position, the movement of the cam 188 (Fig. 19) will permit the spring 187 to move the arm 184 to withdraw the clamping head 182 and thus release the can. The capped can is now free to be removed from the can carrier of the capping mechanism onto a chute or guideway 222, over which it will be conveyed to the sealing mechanism, by means of devices which will now be explained:—A conveyer chain 223 passes over the sprocket wheel 189 near the inlet end of the chute or guideway 222, and over a sprocket wheel 224 on a shaft 225 near the outlet end of said chute or guideway. This chain carries a plurality of spaced arms 226. As the can carrier 75 of the capping mechanism continues its rotary movement upon the completion of the operation of crimping a cap to a can, the capped can will be deflected into the curved inlet end of the chute or guideway 222 and will be engaged by one of the conveyer arms 226 on chain 223, by means of which, said can will be moved forwardly to the inlet of the sealing mechanism. To provide driving means for the conveyer chain, the shaft 225 carries a sprocket 227 (Fig. 14) to which motion is imparted by a chain 228 from a sprocket 229 (Fig. 1) and this last-mentioned sprocket is suitably geared to the shaft 123 to receive motion therefrom.

The sealing mechanism is provided with a plurality of segmental table sections 230 which extend from each sealing chamber casing 23 to the next,—the ends of said table sections being spaced apart in front of each sealing chamber, as shown in Figs. 1 and 3 and the machine frame is provided with a fixed table 231 which forms, in effect, a portion of the discharge end of the chute or guideway 222, as clearly shown in Fig. 3. An arm 226 of the can conveyer will operate to move a can from the outlet end of the chute 222, onto one of the table sections 230 (the can carrier 45 being open, as shown in Figs. 1, 2 and 3) and will become disposed between an arm 232 projecting over a table section 230, and an arm 233 secured to a bracket 234 on the stationary framework. The arm 232 is mounted on a post 235 (Fig. 14) and is rendered yielding by means of a spring 236, as shown in Figs. 3 and 14. The arm 233 will serve to move a can from the can carrier when the latter opens as it approaches the position illustrated in Fig. 3.

The door portion 46 of each can carrier 45 is provided on its outer face with a cam block 237 to engage a slide 238 mounted to move horizontally in the bracket 234 and move said slide rearwardly against the resistance of a spring 239 when a unit of the sealing machine reaches the inlet and discharge position illustrated in Fig. 3. As illustrated in this figure of the drawing, one can is in position to enter the carrier 45 and another can partially discharged therefrom. Discharge of a sealed can from the machine will be effected (as presently explained) by the conjoint action of the slide 238 and a deflecting cam 240 secured to a table section 230, each of said table sections being provided with a deflecting cam 240.

With the parts in the positions shown in Fig. 3, rotary movement of the revoluble frame of the sealing apparatus, will cause the open carrier 45 to receive the can disposed in the path of its travel, movement of said can with the table section 230 being prevented by the yielding arm 232. When the can shall have been received into the can carrier, continued movement of the rotary frame will cause the roller 65 of the can carrier 45 to enter the forward arm of the V-shaped cam-way 58 and cause the carrier to move forwardly to convey the can into the sealing chamber and close the latter. During the closing of the carrier 45, a cam 232ᵃ will permit the arm 232 to move out of the way of said carrier. When the can carrier 45 moves to insert the can into the sealing chamber and close the latter, the slide 238 will be moved forwardly by the action of the spring 239 and become disposed in front of the can which has been sealed and which is to be discharged from the machine. During the forward rotary movement of the rotary frame, the deflecting cam 240 on table section 230 will force the can laterally and cause it to move against the slide 238, until it reaches a pin 241 projecting from said slide, said pin acting to tilt the can and cause it to be deposited upon a discharge chute 242. Returning now, to the operations which occur when a capped can has been placed in a sealing chamber and said chamber has been closed, it may be explained that the portion 46 of the can carrier, which constitutes the door of the sealing chamber, should be pressed so as to insure the hermetic sealing of said chamber. For this purpose spring-pressed plungers 243 mounted in a suitable casing 244 secured to the framework, are provided, each of said plungers having a roller 245 mounted in its free end to be engaged by the cam block 237 on the door portion of the can carrier 45. The spring-pressed plungers will be so located that they will exert their pressure against the door of the can carrier before the sealing chamber shall have been exhausted.

For the purpose of rotating the rotary frame of the sealing apparatus, said frame is provided on its lower portion, with a gear ring 246 suitably secured to depending portions of the casings 23 of the sealing chambers, and said gear ring is further supported by means of depending legs 247 carrying rollers 248 which run on an annular trackway 249 on the stationary frame platform 5. The gear ring 246 receives motion from a pinion 250 on a short shaft 261 mounted in the bearing block 12, and to the other end of this shaft, a gear 252 is secured and receives motion from an idle gear 253, the latter being driven by a pinion 254 on the main driving shaft 11.

The manner of inserting a capped can into a sealing chamber and the manner of rotating the rotary frame of which the casings forming the several sealing chambers form parts, having been explained, it now remains to describe the construction and operation of the devices whereby the cap is double-seamed to the can while in a vacuum chamber, to effect the hermetic sealing of the can, and the sealed can subsequently released from the seaming means:—When a can entered and was inclosed within a sealing chamber, the L-shaped lugs 54 of the platform 53 (on which latter the can rests) became coupled to the flanged head 255 of a plunger 256. In order that the head 255 shall be vertically adjustable relatively to the rod 256, the upper end of the latter is made with a threaded socket to receive the threaded shank 255$^a$ of said head, and said shank is made with a plurality of vertical grooves 255$^b$, in any one of which, a set screw 255$^c$ enters to prevent said head from turning. The rod 256 is vertically movable through a tubular extension of the casing 23 which forms one unit of the sealing mechanism. This plunger is made with a socket into which a shank 257 enters and the lower end of this shank is made with a head 258 carrying a roller 259 to run on a cam-way 260. Between the upper end of the shank 257 and the upper end of the socket in the plunger, a spring 261 is located and movement of the shank relatively to the plunger is limited by a pin and slot construction as indicated at 262. Another roller 263 is mounted on one side of the head 258 and engages a cam-way 264 for the purpose of lowering the plunger 256 and can platform 53 when the sealing unit of the machine arrives at the point of discharge for the sealed cans, as more fully hereinafter explained.

The hooded portion of each sealing chamber casing 23 is made with an upward tubular extension 265, provided at its upper end with a yoke 266. A tubular shaft 267 passes through the tubular extension 265 and top portion of the yoke 266 and this tubular shaft is provided at its lower end (within the hooded portion of the sealing chamber) with a flanged head 268. A tube 269 passes freely through the shaft 267 and head 268 and is provided at its lower end with an annular flange 269$^a$. A head 270 is secured to the upper end of the tube 267 and adapted to engage a cam 271 (for a purpose hereinafter explained) and the movements of this head are guided by pins 272 secured to the top of the yoke 266 and entering sockets in said head. A spring 273 tends normally to force the head 270 and the tube 267 upwardly.

Double seaming devices are located within each sealing chamber and coöperate with the flanged heads 268. Each set of seaming devices comprises a revoluble carrier 274 (Fig. 6) at the lower end of a tubular shaft 275 passing through the tubular extension 265. Two arms 276 are pivotally attached between their ends to opposite arms of the carrier 274 and at one end of each of these arms, a seaming roller 277 is mounted. These seaming rollers coöperate with the flanged head 268 to double-seam the edge of a cap to a can body, as shown at the left of Fig. 2, and for this purpose, they are pressed toward the capped can during a portion of the travel of the sealing chamber of the revoluble frame, in which the can is inclosed. For thus pressing the seaming rollers to their work, a cam 278 (Figs. 4 and 6) is provided and coöperates with spring fingers 279 pivoted to the carrier 274 and held in adjusted position by screws 280. The two arms 276 are connected by a spring 281 which operates to swing the arms 276 and thus move the seaming rollers 277 away from the can when the fingers 279 are not in contact with the cam 278. In order to effect the proper operation of the seaming rollers, it is necessary that the parts carrying said rollers shall be rotated, and in order that the proper manipulation of the seaming rollers shall be effected, to move them toward and away from the can and its cap, cam 278 should be rotated at a speed different from the speed of rotation of the seaming roller carriers. As means for rotating the seaming roller carrier and the cam 278, the mechanism now to be described may be employed,—reference being made to Figs. 2, 4 and 7 of the drawing which show this mechanism.

The tubular shaft 275 of each seaming-roller carrier 274 is provided at its upper end (within yoke 266) with a gear 282, and each cam 278 is carried by the lower end of a tubular shaft 283 passing upwardly through the tubular shaft 275,—said shaft 283 being provided at its upper end with a gear 284, which is somewhat smaller than the gear 282.

A large gear wheel 285 is secured to the central shaft 9 and meshes with all the gears 284, and a somewhat smaller large gear wheel 286 is secured to a central tubular shaft 287 through which said shaft 9 passes, and transmits motion to all of the gears 282. The central shaft 9 is provided near its lower end with a bevel gear 288 which receives motion from a bevel gear 289 on shaft 11, and the central tubular shaft 287 is provided at its lower end with a bevel gear 290 (larger than the gear 288) and receives motion from a bevel gear 291 (larger than the gear 289) on the same shaft 11.

The tube 267 of each sealing unit, (which tube is open at its lower end) is provided at its upper end with a port 292, which is normally closed by a spring-pressed valve 293. Each valve 293 is provided with an arm 294 adapted to engage an arm 295 on the framework, when said sealing unit of the revoluble frame approaches the discharge position for a sealed can, and open said valve 293 for a purpose hereinafter explained.

It has been hereinbefore explained how a can is capped without hermetically sealing it, and how the capped can is inclosed within a sealing chamber, and the mechanism whereby the cap is double-seamed to the can while in a vacuum sealing chamber, has also been explained. When, during the operation of the sealing mechanism, one of the units thereof moves from the can-receiving position shown at the right of Fig. 2, and the can has been inclosed within the sealing chamber as previously explained, the movement of the roller 259 (Figs. 2 and 4) over the cam way 260 will cause the can to be raised to the seaming mechanism as shown at the left of Fig. 2. After a sealing chamber has passed the door-pressing devices 242 (Figs. 1 and 3) the hood 22 of the revoluble frame will have turned sufficiently to open communication between the ducts 26—27 and the valve 28 and thus permit the air to be exhausted from the sealing chamber. It will be understood that the revoluble frame comprises several sealing chamber units and that two or more of these sealing chambers will be exhausted during one complete revolution, but the chambers of the exhaust valve are separated from each other as previously explained, and while a sealing chamber will remain exhausted during the operation of double-seaming the cap to the can, still the exhausting of one sealing chamber will not affect the maintenance of a proper degree of vacuum in another sealing chamber.

As above mentioned, the double seaming mechanism will operate on a can in a sealing chamber during the time that said chamber is exhausted, and as said sealing chamber approaches the position shown at the right of Figs. 1 and 2 (where a sealed can is discharged from and a capped can received into the sealing chamber), the arm 294 of valve 293 will engage the cam 295 and thus open said valve to admit atmospheric pressure through the tube 269 onto the cap of the can. At approximately the same time that this occurs, the head 270 on the tube 269 will engage the cam 271, whereby the tube 269 will be pressed downwardly to force the can away from the seaming mechanism. At about the same time, the roller 259 (Fig. 4) will enter the depressed portion of the cam-way 260, thus permitting the descent of the can and the platform 53 on which it rests, and such descent will be further enforced by coöperation of the rollers 263 with the cam 264. The sealing chamber now proceeds to the position shown at the right of Fig 2, and will be opened and the sealed can discharged in the manner hereinbefore explained.

A stop 296 is provided to prevent the feeding of cans to a sealing chamber or unit of the sealing mechanism which may have become incapacitated from any cause, and means are provided for automatically moving this stop from its normal position shown in full lines in Fig. 3 (where it forms part of the outer flange of the guideway 222 over the table 231) to the dotted line position across the can chute 222. These means comprise an arm 297 secured to the stop 296 and connected by a link 298 with the long arm of a bell-crank lever 299. The other arm 300 is disposed over the plane of the table sections 230 in position to be engaged by a roller 301 carried by an arm 302 attached to a sealing chamber unit, when said arm is in the dotted line position shown diagrammatically in Fig. 3. It will be understood that each sealing chamber unit is provided with an arm 302, but these arms will be normally disposed in inoperative positions as shown in full lines in Fig. 1 and will only be moved to the dotted line position when a sealing chamber unit has become disabled.

For the purpose of retaining the stop arm 296 in and return the same to its normal position, a spring 299ª may be provided, one end of said spring being secured to a fixed support and the other end to the lever 299. It is apparent that when an arm 302 is disposed in the dotted line position (to which position it may be adjusted manually), it will engage the arm 300 of bell-crank 299 before the sealing chamber unit reaches a position to receive a can from the feeding mechanism, and that movement of the bell-crank will be transmitted through the link 298 and an arm 297 to the stop 296 and cause the latter to be projected across the path of the cans and thus prevent the feeding of the same until the disabled sealing chamber unit shall have passed the can receiving and discharging position.

Should a can entering the can carrier b. so mutilated or misshaped as to prevent th closing of the sealing chamber, the sealing mechanism, as well as the capping mechanism and the feeding means between said mechanisms should be promptly stopped. This is accomplished automatically by means of the devices which will now be explained: It will be recalled that the can carriers 45 (which also constitute closures for the sealing chambers) are provided with rollers 65 (Fig. 2) which coöperate with a V-shaped cam-way 58 (Figs. 2 and 3) for moving said can carriers to open and close the sealing chambers, and it will also be recalled that the forward wall 60 of this cam-way is made in the form of a yielding gate having an arm 62. It will be apparent that if a mutilated can should be so disposed in the can carrier 45 in such manner as to prevent the latter from closing the sealing chamber, engagement of the roller 65 with the yielding cam wall or gate 60 would cause the latter to swing outwardly and its arm 62 to engage the upper arm of a lever 62$^a$ as shown in Fig. 2$^a$. This lever is pivotally connected between its ends to an arm on the fixed framework and its lower end loosely embraces a rod 62$^b$. The rod 62$^b$ is attached at one end to the hand lever 13$^b$ and at the other end to a hand lever 62$^c$, so that the clutch 13$^a$ for stopping and starting the sealing and capping mechanisms may be operated from either side of the apparatus, and as the rod 62$^b$ passes freely through the lever 62$^a$, these operations may be accomplished without affecting said lever. In proximity to the lower end of the lever 62$^a$, a block or stop 62$^d$ is secured to the rod 62$^b$ so that when the swinging wall or gate 60 is forced outwardly by failure of a can carrier 45 to close its sealing chamber (on account of the presence of a mutilated can), the arm 62 will engage the upper arm of lever 62$^a$ and actuate said lever in such manner as to cause its lower end to engage the block or stop 62$^d$ on rod 62$^b$ and thus impart motion to the clutch to stop the sealing and capping mechanisms and the intermediate feeding devices.

Having fully described my invention what I claim as new and desire to secure by Letters-Patent, is:—

1. The combination of means for applying caps to cans, and means for denting the cans to form exit ducts between the can and cap to prevent hermetic sealing.

2. The combination of means for applying caps to cans, means for denting the upper edges of the cans, and means for crimping the caps on the dented upper edges of the cans.

3. In a can capping machine, the combination with a rotary can carrier, a rotary cap carrier, an anvil between said carriers, a marking die over said anvil, and means for automatically operating said die to indent an identifying mark in a cap carried by the cap carrier and disposed over said anvil.

4. In a can capping machine, the combination with a rotary can carrier, a rotary cap carrier, means for feeding cans to the can carrier, means for feeding caps to the cap carrier, an anvil between said carrier, a die over the anvil, means for automatically operating said die to indent an identifying mark in a cap while the latter is in the cap carrier, and means operating automatically to subsequently apply the cap to the can.

5. In can sealing apparatus, the combination with a rotary can carrier, means for rotating the same step-by-step, and means for feeding cans to said carrier, of means for denting the upper edge of a can in said carrier, and means for crimping a cap to the dented upper end of the can.

6. The combination with a rotary can carrier, and a cap carrier secured thereon, of means for denting the upper edge of a can in said can carrier, means for depositing a cap in said cap carrier over a can in the can carrier, crimping means, means for raising the can and cap to the crimping means, means for operating the crimping means to crimp the cap to the dented upper end of the can, and means for discharging the capped can.

7. The combination with a rotary can carrier comprising superimposed disks having can-receiving recesses, the upper disk having curved flanges provided with depressed shoulders having recesses, and a clamping head having a shoulder provided with recesses, of a die having projections, and means for operating said die to dent the upper edge of a can.

8. The combination with a fixed platform having an opening, and a rotary can carrier over said platform and having a plurality of can receiving recesses, of a can-supporting platform in the opening in the fixed platform, a yoke fixed across the opening in the fixed platform, a spring between said yoke and can-supporting platform, a clamping head coöperating with the can carrier to hold a can, a die for denting the upper edge of the can, and means for operating said die.

9. The combination with a can carrier, and denting devices, cap discharging means and crimping devices, associated with said can carrier, of means for rotating said can-carrier step-by-step.

10. The combination with a rotary can carrier, a cap carrier secured to said can carrier and can capping mechanism associated with said carriers, of a cap ejector, and cam-actuated devices for operating said ejector to remove a cap from the can carrier when no can has been placed in position to receive such cap.

11. The combination with framework, a can carrier, a shaft for said can carrier, a cap carrier secured to the can carrier, and can capping mechanism associated with said carrier, of a cap ejector, a vertically movable rod for said ejector, a cam, a yoke coöperating with said cam and moved vertically thereby, and a connection between said yoke and the rod of the ejector to operate the latter to eject a cap from the cap carrier.

12. The combination with a can carrier and a movable clamping head coöperating therewith to clamp a can, of a die to dent the upper edge of the can, means for operating said die, said clamping head having an arm, a rack bar secured to said arm, a vertically movable rack bar, a pinion between said rack bar, and cam devices for reciprocating the vertically movable rack bar.

13. The combination with a can carrier and a movable clamping head having an arm, a rack bar carried by said arm, a vertically movable rack bar, a pinion between said rack bar, a cam, means for rotating said cam, and yielding connections between said cam and the vertically movable rack bar.

14. The combination with a frame, a can carrier and means for holding a can in said can carrier, of a tubular shaft for the can carrier, a die for denting the upper edge of a can, a mandrel for said die, a shaft vertically movable through said tubular shaft, cam devices for reciprocating said vertically movable shaft, and a lever pivoted between its ends and pivotally connected with the vertically movable shaft and the mandrel of the die.

15. The combination with a fixed platform, a rotary can carrier, guide coöperating therewith, and a cap carrier having cap-receiving openings, of a cap magazine to deposit caps in the openings of the cap carrier, a swinging arm to which said cap magazine is secured, means for manually swinging said arm to move the magazine into or out of operative position, and a spring-actuated dog for holding the magazine in the position to which it may be moved, and means for clamping a cap to a can.

16. The combination with a frame, a rotary can carrier and a cap carrier, of an anvil over which a cap is moved by the cap carrier and under which a can is moved by the can carrier, a vertically movable die carrier disposed above the cap carrier, a marking die adjustable in said die carrier, a vertically-movable shaft, cam devices for moving said shaft vertically, a pivoted lever movable by said shaft, a pivoted lever interposed between said first-mentioned pivoted lever and said die carrier for operating the die to mark a can cap while the latter is over the anvil, and means for subsequently applying the cap to the can.

17. The combination with a fixed platform, a rotary can carrier, a can support, and crimping mechanism over the can carrier and in vertical alinement with said can support, of a yielding clamping head to engage a can and hold it in the carrier under the crimping mechanism, a pivoted arm carrying said yielding clamping head, a cam for moving said arm to move the clamping head into engagement with a can, a spring for withdrawing said arm and clamping head when released by the cam, and means for raising and lowering the can support.

18. The combination with framework and a can carrier, of mechanism for crimping a cap to a can in said carrier, said mechanism comprising a shaft, a head at the lower end thereof, a plurality of crimping jaws having arms pivotally supported by said shaft, each crimping jaw being elongated and having a groove whose arc is eccentric to the axis of the shaft, a cone movable on said shaft and coöperating with the arms of the crimping jaws, a vertically movable shaft, cam devices for reciprocating said shaft, and connections between said vertically movable shaft and the cone for operating the latter.

19. The combination with frame-work, a can carrier, means for operating the same, a cap carrier secured to the can carrier and can capping mechanism associated with the can carrier, of a vertically movable rod, an arm on said rod, a cap ejector having an arm pivoted on the arm on the rod and provided with a toe to engage the cap carrier, a stop for the ejector arm, and means for moving said rod vertically.

In testimony whereof, I have signed this specification in the presence of two subscribing witnesses.

ADOLPH MALMQUIST.

Witnesses:
H. B. DRISKO,
E. D. MILLER.